US011004303B2

(12) United States Patent
Liu et al.

(10) Patent No.: US 11,004,303 B2
(45) Date of Patent: May 11, 2021

(54) GAMING TERMINAL MANAGEMENT

(71) Applicant: Surfnote, Inc., Norcross, GA (US)

(72) Inventors: Ming C. Liu, Suwanee, GA (US); Urban Bergant, Mengeš (SI); Kristjan Ažman, Mengeš (SI); Klemen Peterlin, Mengeš (SI); Matjaž Sprogar, Mengeš (SI)

(73) Assignee: Surfnote, Inc., Norcross, GA (US)

(*) Notice: Subject to any disclaimer, the term of this patent is extended or adjusted under 35 U.S.C. 154(b) by 2 days.

(21) Appl. No.: 15/261,672

(22) Filed: Sep. 9, 2016

(65) Prior Publication Data

US 2017/0076543 A1 Mar. 16, 2017

Related U.S. Application Data

(60) Provisional application No. 62/216,815, filed on Sep. 10, 2015.

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |
| ***G07F 17/32*** | (2006.01) |

(52) U.S. Cl.
CPC ...... *G07F 17/3234* (2013.01); *G07F 17/3223* (2013.01); *G07F 17/3225* (2013.01)

(58) Field of Classification Search
CPC ............. G07F 17/3239; G07F 17/3234; G07F 17/3225
See application file for complete search history.

(56) References Cited

U.S. PATENT DOCUMENTS

2002/0155887 A1* 10/2002 Criss-Puszkiewicz ...................... G07F 17/32 463/29
2005/0239546 A1* 10/2005 Hedrick .............. G07F 17/0014 463/29
2009/0082109 A1* 3/2009 Sepich .................... G07F 17/32 463/40
2010/0124983 A1* 5/2010 Gowin .................... G07F 17/32 463/25

* cited by examiner

*Primary Examiner* — Kang Hu
*Assistant Examiner* — Jason Pinheiro
(74) *Attorney, Agent, or Firm* — Taylor English Duma LLP

(57) ABSTRACT

Methods, apparatuses, and computer-readable media for enabling monitoring and managing aspects of gaming terminals and related game plays. One method of monitoring a gaming terminal comprises steps of receiving, by a companion board communicatively coupled to a gaming board of the gaming terminal, data regarding various aspects of game play at the gaming terminal; transmitting, by the companion board, the data to a communication board utilizing a first protocol; and transmitting, by the communication board, the data from the communication board to a monitoring system utilizing a second protocol.

17 Claims, 29 Drawing Sheets

202

312

312

312

514

514

514

GAMING TERMINAL MANAGEMENT

CROSS-REFERENCE TO RELATED APPLICATIONS

This application claims the benefit of U.S. Provisional Application No. 62/216,815, filed Sep. 10, 2015, and entitled "GAMING TERMINAL MANAGEMENT," the entire disclosure of which, including the appendices, is hereby incorporated herein by this reference.

BACKGROUND

A gaming terminal enables players to play games. For example, a gaming terminal may be implemented to enable players to play games of chance or lottery games. In various aspects, a gaming system comprised of gaming terminals is implement across multiple locations. The gaming system monitors aspects of the gaming terminals within the gaming system.

BRIEF SUMMARY

The present disclosure relates to technologies for enabling monitoring and managing aspects of gaming terminals and related game plays. In some embodiments, a method of monitoring a gaming terminal comprises steps of receiving, by a companion board communicatively coupled to a gaming board of the gaming terminal, data regarding various aspects of game play at the gaming terminal; transmitting, by the companion board, the data to a communication board utilizing a first protocol; and transmitting, by the communication board, the data from the communication board to a monitoring system utilizing a second protocol.

In further embodiments, an apparatus for monitoring a legacy gaming terminal comprises a communications board communicatively coupled to a gaming board of the legacy gaming terminal and configured to receive information regarding various aspects of game play from the gaming board. The communications board is further configured to transmit data associated with the information to a monitoring system utilizing the standard Slot Accounting System ("SAS") protocol. The apparatus may further comprise a companion board interposed between a processing resource of the gaming board and a memory module of the gaming board and communicatively coupled to the communications board. The companion board is configured to intercept writes of information to the memory module by the processing resource and transmit the data associated with the information to the communications board.

In further embodiments, a computer-readable storage medium contains processor-executable instructions that, when executed by a processing resource on a companion board communicatively coupled to a gaming board of a gaming terminal, cause the processing resource to detect a change of information in a memory module of the gaming board and transmit data associated with the changed information to a communications board utilizing a first protocol, wherein the communication board is configured to transmit the data to a monitoring system utilizing a second protocol.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The following detailed description references the drawings, in which.

DETAILED DESCRIPTION

Figure 1:
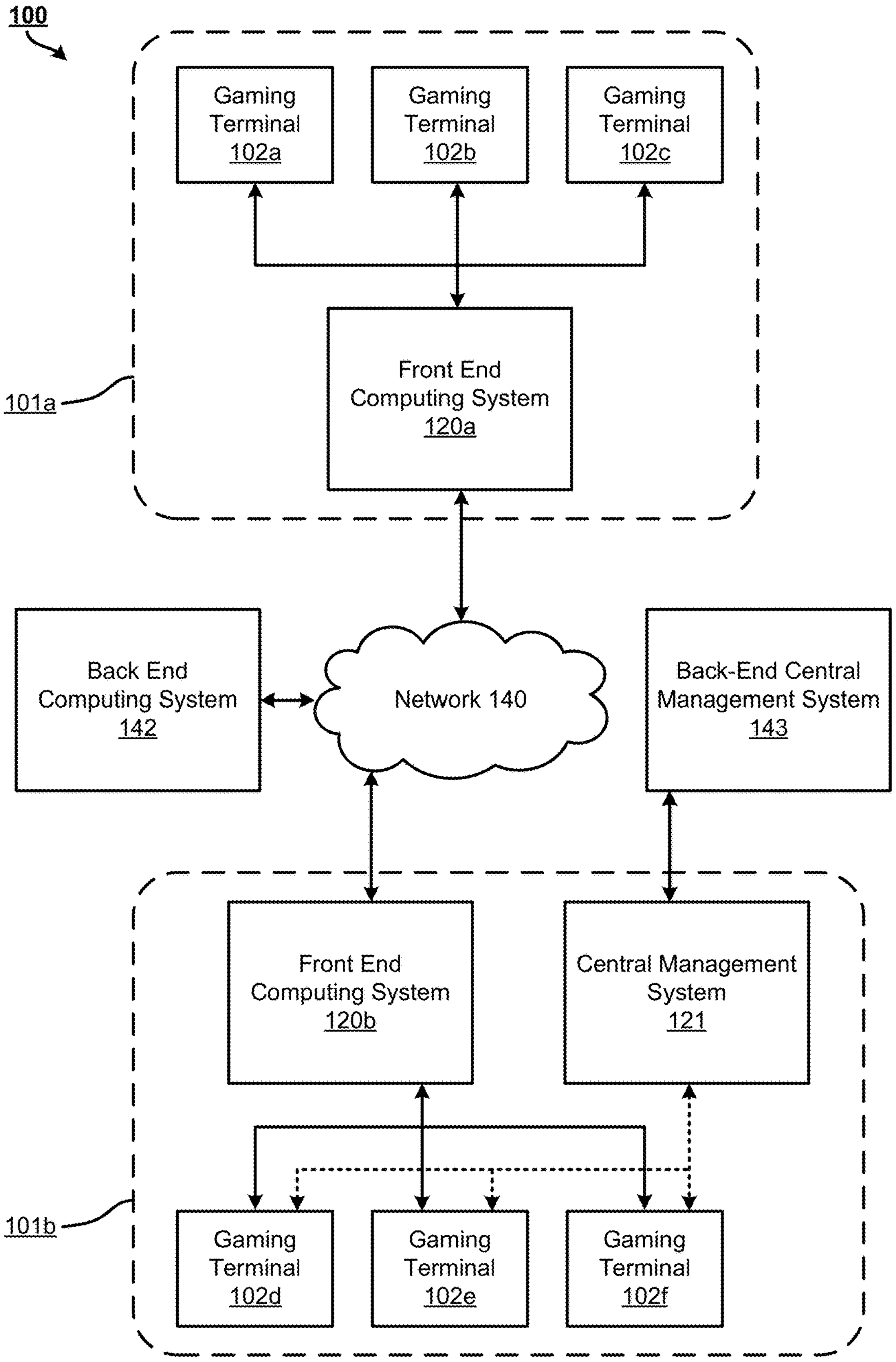
FIG. 1 illustrates a diagram of a gaming management system according to aspects of the present disclosure.

Gaming terminals enable players to play games of chance, lottery games or other suitable types of games. These gaming terminals may be deployed in various locations such as retail establishments (e.g., gas stations, convenience stores, grocery stores, airports, etc.). Players may pay the games of chance or lottery games by depositing money or credits into a gaming terminal. If the player wins a game, the player may receive money or credits in return. In examples, the credits received for a win comprise discounts on merchandise at the retail establishment, free merchandise at the retail establishment, credit to be used for future game plays, and the like or combinations thereof.

In order to ensure fair and accurate game play, jurisdictional governmental entities may implement requirements for monitoring and managing the gaming terminals. To satisfy these requirements, front end computing systems may be implemented at the retail establishments having the gaming terminals to monitor and manage the gaming terminals. A front end computing system may be communicatively connected to a game board of each of the gaming terminals. The game board facilitates game play and monitors aspects of the game (e.g., money in, money out, credits in, credits out, number of games played, number of games won, frequency of games won, door alarms, etc.) and collects data associated therewith. These data may then be transmitted to the front end computing system at the retail location, which may relay the data to a gaming management system.

Although the current approaches provide some game play monitoring and management aspects, the current approaches are limited to collecting limited types of data. Accordingly, some of the current approaches do not comply with new and changing jurisdictional requirements. Moreover, the current approaches are limited in that they do not provide for additional game play and management features. Currently there are numerous gaming machines operating in the field. Due to the changed legislation in certain jurisdictions with the purpose to have better control over gaming machines' operators, these gaming terminals must be connected to central supervisory system using gaming industries' standard slot accounting system (SAS) protocol which provides the gaming management system information about the gaming terminals. Some gaming terminals already installed in the field are of a relatively old design and are considered legacy gaming terminals. The change of hardware and software required to support the newly required SAS functionality would induce serious investment costs.

Various implementations are described herein by referring to several examples of gaming terminal management techniques. In one example implementation according to aspects of the present disclosure, a gaming terminal comprises a game board, a companion board, and a communication board.

In another example implementation according to aspects of the present disclosure, a gaming terminal comprises a game board having a processing resource and a memory resource, a companion board communicatively coupled to the game board between the game board and the memory of the game, and a communication board communicatively coupled to the game board and the companion board.

In another example implementation according to aspects of the present disclosure, a gaming terminal comprises a game board having a processing resource and a memory resource, a companion board communicatively coupled to the game board between the game board and the memory of the game board to enable the companion board to read data as it is written to the memory of the game board, and a communication board communicatively coupled to the game board and the companion board to communicate the data read by the companion board to a front end computing system.

In another example implementation according to aspects of the present disclosure a gaming terminal communication board comprises a first port configured to communicatively couple the communication board to the front end computing system, and wherein the communication board comprises a second port configured to communicatively couple the communication board to a legacy front end computing system.

In another example implementation according to aspects of the present disclosure, a method to monitor a gaming terminal comprises receiving data via a companion board communicatively coupled to a game board of a gaming terminal between the game board and a memory of the game board, and communicating the received data to a front end computing system.

In another example implementation according to aspects of the present disclosure, a point of sale system comprises a processing resource, and a memory resource, the memory resource configured to perform the steps of receiving data from a plurality of gaming terminals, and transmitting the data received from the plurality of gaming terminals to a gaming system.

Generally, the present disclosure enables monitoring and managing aspects of gaming terminals and related game plays. In examples, the presently described techniques enabling collecting previously unavailable data and transmitting it to computing systems for monitoring and analysis. The present techniques provide additional functionality at lower costs than existing implementations. Additionally, the present disclosure provides a slot accounting system (SAS) protocol solution for gaming machines without changing the hardware or software on said gaming machines. Moreover, the present disclosure overcomes presented problems by adding additional proprietary hardware with proprietary firmware which implements the functionality requested by the SAS protocol without changing the gaming terminal hardware (the game board) and software. These include but are not limited to gaming terminal accounting, events reporting (exceptions), and providing the mechanism for transfer of credits to and from the gaming terminal. These and other advantages will be apparent from the description that follows.

FIGS. 1-6 include particular components, modules, circuits, instructions, engines, etc. according to various examples as described herein. In different implementations, more, fewer, and/or other components, modules, circuits, instructions, engines, arrangements thereof may be used according to the teachings described herein. In addition, various components, modules, engines, etc. described herein may be implemented as instructions stored on a computer-readable storage medium, hardware modules, special-purpose hardware (e.g., application specific hardware, application specific integrated circuits (ASICs), embedded controllers, hardwired circuitry, etc.), or some combination or combinations of these.

Generally, FIGS. 1-6 relate to components, modules, circuits, and instructions of a computing system. It should be understood that the computing system may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, wearable computing devices, gaming devices or the like and suitable combinations thereof.

FIG. 1 illustrates a diagram of an environment a diagram of a gaming management system 100 according to aspects of the present disclosure. As illustrated, the gaming system 100 comprises gaming terminals 102*a*-102*f*, front end computing systems 120*a* and 120*b*, legacy central management system 121, back end computing system 140, and network 142. Generally, the gaming system 100 enables players to play games (e.g., games of chance, lottery games, etc.) on the gaming terminals. The gaming system monitors aspects of the gaming terminals within the gaming system through the front end computing system(s) and back end computing system(s).

In the example illustrated in FIG. 1, the gaming system is deployed across a first location 101*a* and a second location 101*b*, illustrated by dashed lines in the figure. Each location 101*a* and 101*b* comprises gaming terminals and a front end computing system. For example, location 101*a* comprises gaming terminals 102*a*-102*c* and front end computing system 120*a*. Similarly, location 101*b* comprises gaming terminals 102*d*-102*f* and front end computing system 120*b*. Location 101*b* may also comprise legacy central management system 121. Each location may represent a separate, physical location. For example, a location may represent a retail establishment such as a grocery store, a gas station or convenience store, or other suitable location. In other examples, each location may represent logical locations within the same physical location. For example, a retail location may include a first location and a second location where the gaming terminals are located.

The gaming terminals are communicatively connected to the front end computing systems. For example, at location 101*a*, gaming terminals 102*a*-102*c* are communicatively connected to the front end computing system 120*a*. Similarly, at location 101*b*, gaming terminals 102*d*-102*f* are communicatively connected to the front end computing system 120*b*. In examples, the gaming terminals 102*d*-102*f* are also communicatively connected to the legacy central management system 121.

The arrowed solid and dotted lines of FIG. 1 illustrate communicative paths between and among the gaming terminals 102*a-f*, the front end computing systems 120*a* and 102*b*, the legacy central management system 121, the network 140, the back end computing system 142, and the legacy back end computing system 143. The paths generally represents a network, illustrated as network 140, that may include hardware components and computers interconnected by communications channels that enable sharing of resources and information. The network may include one or more of a cable, wireless, fiber optic, or remote connection via a telecommunication link, an Ethernet link, an infrared link, a radio frequency link, a Bluetooth link, a cellular link, a SMS link, a serial link (e.g., RS-232), or any other links, connectors, or systems, or suitable combinations thereof that provide electronic communication. The network may include, at least in part, an intranet, the internet, or a combination of both. The network may also include intermediate proxies, routers, switches, load balancers, and the like. The paths followed by the network between the devices as depicted in FIG. 1 represent the logical communication paths between the devices, not necessarily the physical paths between and among the devices.

In examples, the communicative paths (or connections) between and among the gaming terminals 102*a-c* and front end computing system 120*a* at location 101*a*, and the communicative connections between and among the gaming terminals 102*d-f*, front end computing system 120*b*, and legacy central management system 121 may comprise Ethernet or other internet protocol connections, serial RS-232 connections, wireless network connections (e.g., 802.11 compliant connections, Bluetooth corrections, radio frequency connections, etc.) and any other suitable connection and combinations thereof. In examples, cellular technologies such as GSM, GPRS, CDMA, SMS, or other suitable protocols may be utilized. Other techniques may also be utilized, including radio frequency, infrared, Bluetooth, or other wireless and/or wired communications techniques and combinations thereof.

Although not shown in FIG. 1, it should be appreciated that the gaming terminals 102*a-f*, the front end computing systems 120*a* and 102*b*, the legacy central management system 121, the back end computing system 142, and the legacy back end computing system 143 may include additional components. For example, any of the gaming terminals 102*a-f*, the front end computing systems 120*a* and 102*b*, the legacy central management system 121, the back end computing system 142, and the legacy back end computing system 143 may include a processing resource that represents generally any suitable type or form of processing unit or units capable of processing data or interpreting and executing instructions. The processing resource may be one or more central processing units (CPUs), microprocessors, digital signal processors, and/or other hardware devices suitable for retrieval and execution of instructions. The instructions may be stored, for example, on a memory resource (not illustrated), such as a computer-readable storage medium, which may include any electronic, magnetic, optical, or other physical storage device that store executable instructions. Thus, the memory resource may be, for example, random access memory (RAM), electrically-erasable programmable read-only memory (EPPROM), a storage drive, an optical disk, and any other suitable type of volatile or non-volatile memory that stores instructions to cause a programmable processor (i.e., processing resource) to perform the techniques described herein. In examples, the memory resource includes a main memory, such as a RAM in which the instructions may be stored during runtime, and a secondary memory, such as a nonvolatile memory in which a copy of the instructions is stored.

Additionally, the gaming terminals 102*a-f*, the front end computing systems 120*a* and 102*b*, the legacy central management system 121, the network 140, the back end computing system 142, and the legacy back end computing system 143 may include engines for executing programmatic instructions. In examples, the engines may be a combination of hardware and programming. The programming may be processor executable instructions stored on a tangible memory, and the hardware may include processing resource, for example, for executing those instructions. Thus a memory resource (not shown) can be said to store program instructions that when executed by the processing resource implement the engines described herein. Other engines may also be utilized to include other features and functionality described in other examples herein.

Alternatively or additionally, the gaming terminals 102*a-f*, the front end computing systems 120*a* and 102*b*, the legacy central management system 121, the back end computing system 142, and the legacy back end computing system 143 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing cores) may be used, as appropriate, along with multiple memory resources and/or types of memory resources.

Additionally, the gaming terminals 102*a-f*, the front end computing systems 120*a* and 102*b*, the legacy central management system 121, the back end computing system 142, and the legacy back end computing system 143 may include a display. The display may be or include a monitor, a touchscreen, a projection device, and/or a touch/sensory display device. The display may display text, images, and other appropriate graphical content. The gaming terminals 102*a-f*, the front end computing systems 120*a* and 102*b*, the legacy central management system 121, the back end computing system 142, and the legacy back end computing system 143 may also include a network interface to communicatively couple the devices, such as via the network 140, and to other computing systems and/or computing devices. The gaming terminals 102*a-f*, the front end computing systems 120*a* and 102*b*, the legacy central management system 121, the back end computing system 142, and the legacy back end computing system 143 may also include any suitable input and/or output device, such as a mouse, keyboard, printer, magnetic card reader, radio frequency identifier (RFID) reader, bar code reader, external disk drive, or the like.

The legacy central management system 121 may be an existing computing system within a location that is configured to track certain limited aspects of the gaming terminals 102*d-f*). An example of a legacy central management system 121 is an Interlot system. The legacy central management system 121 is configured to communicate data relating to the limited aspects to the legacy back end computing system 143.

As will be further understood, the functionality and additional details of the gaming management system 100 of FIG. 1 is further described below.

Figure 2A:
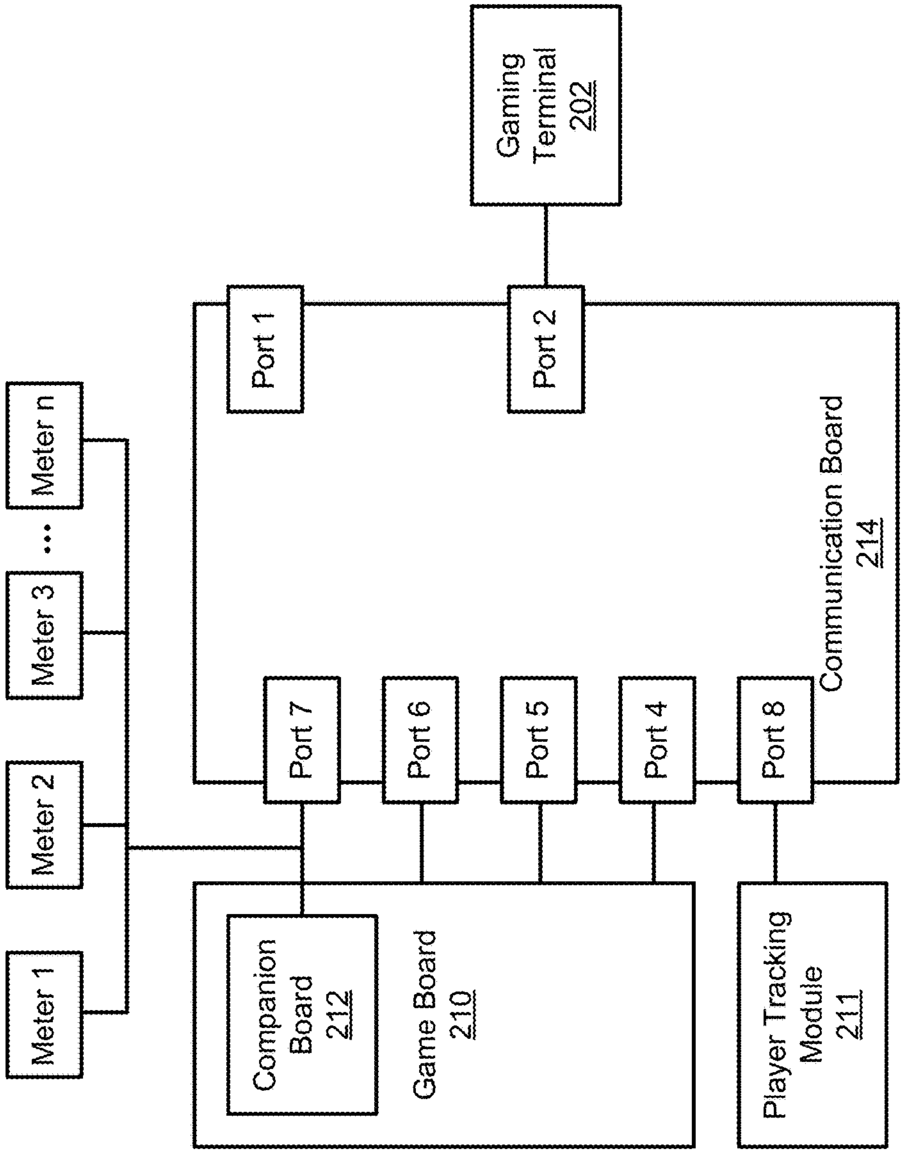
FIG. 2A illustrates a block diagram of a gaming terminal of a gaming management system, such as the gaming management system of FIG. 1, according to aspects of the present disclosure.

FIG. 2A illustrates a block diagram of a gaming terminal 202 of a gaming management system, such as the gaming management system of FIG. 1, according to aspects of the present disclosure. Generally, when a player plays a game on gaming terminal 202 (which may represent any of the gaming terminals 102*a-f* of FIG. 1), game board 210 of the gaming terminal 202 facilitates the game play and tracks various aspects of the game play. For example, the game board facilitates game play and monitors aspects of the game (e.g., money in, money out, credits in, credits out, number of games played, number of games won, frequency of games won, door alarms, etc.) and collects data associated therewith.

The data is collected at the game board, for example, by companion board 212. The companion board 212 is communicatively coupled to the game board 210 of the gaming terminal 202 between the game board 210 and a memory of the game board (not illustrated). This enables the companion board 212 to read data as it is written to the memory of the game board. Companion board 212 is also communicatively coupled to communication board 214, either directly and/or through a wired (e.g., a wiring harness) or wireless connection, for example, at port 7 of communication board. In this way, the data collected by game board 212 is communicated to communication board 214.

In examples, companion board 212 is communicatively coupled to the game board 210 in such a way that game board 210 is unaware of the existence of companion board 212. For example, the companion board 212 may be coupled between game board 210 and a memory module of the game board 210. During installation, the memory module may be temporarily removed from game board 210. Companion board 212 is then installed on game board 212, and the memory module is then reinstalled onto companion board 212. In this way, companion board 212 reads the data transferred from game board 212 to the memory module as it passes through companion board 212. Accordingly, game board 210 operates as if companion board 212 were not communicatively coupled to the game board 210.

The data collected by the game board 210 and written to the memory module is collected by the companion board 212 and transmitted to communication board 214, which then transmits the data to a point of sale device, such as front end computing system 120*b* and/or legacy central management system 121 of FIG. 1 across ports 1 and/or 2. In examples, port 1 of the communication board 214 is communicatively coupled, either through a wired and/or wireless connection, to the front end computing system 120*b*, and port 2 of the communication board 214 is communicatively coupled, either through a wired and/or wireless connection, to the legacy central management system 121. The legacy central management system 121 may be configured to receive the data collected by game board 210 as intercepted by companion board 212, while the front end computing system 120*b* may be configured to receive the data collected by the game board 210 as intercepted by companion board 212 and also additional data generated by the game board, which may be received at communication board 214 via port 7. The additional data generated by the game board may be collected via virtual counters or "meters" (e.g., meter 1, meter 2, meter 3, . . . meter n), each meter for collecting a different aspect of the game play. In other examples, other numbers of meters may be implemented. As illustrated in FIG. 2C, physical counters or meters may also be implemented (e.g., meter 4, meter 5, meter 6, . . . meter n) via port 4. The communication board 214 detects analog pulses at port 4 through port 6, the pulses representing analog signals representative of the different aspects of game play collected. Port 4 may be partitioned to recognize the difference meters and pulses associated therewith individually. For example, port 4 may be partitioned into four sub-ports, each connected to one of the meters.

Figure 2B:
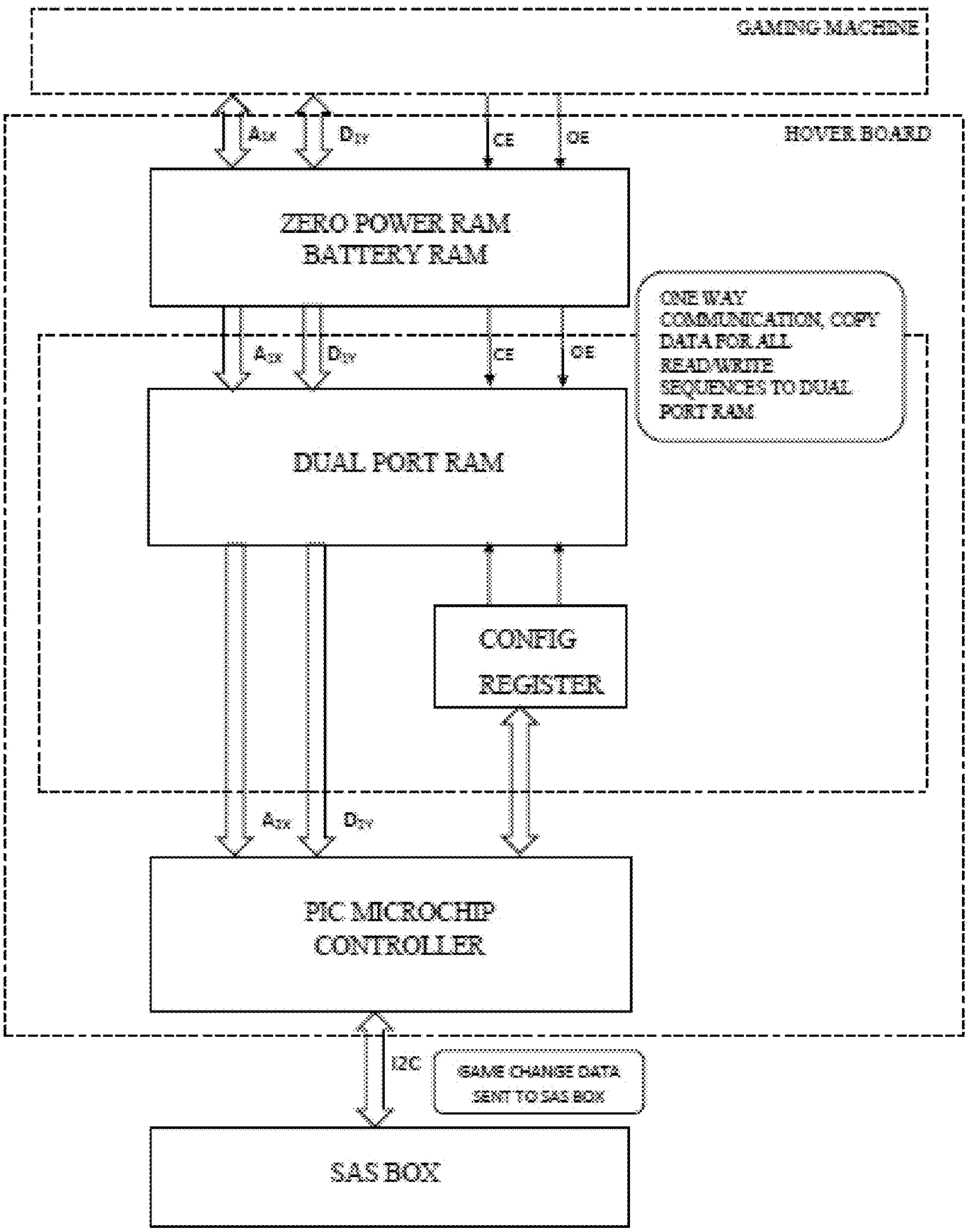
FIG. 2B illustrates a block diagram of a gaming terminal 202 of a gaming management system, such as the gaming management system of FIG. 1, according to aspects of the present disclosure.
Figure 2C:
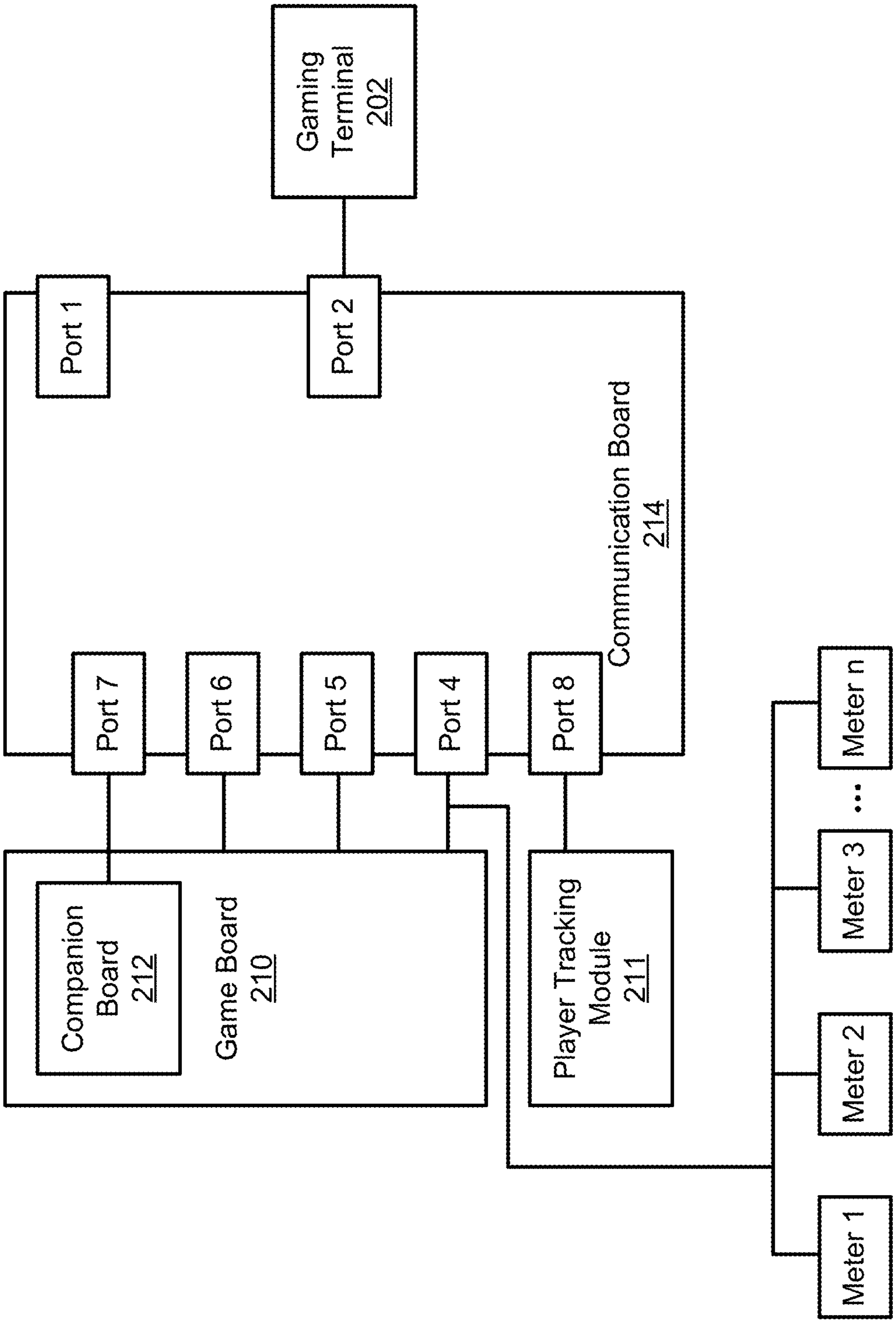
FIG. 2C illustrates a block diagram of a gaming terminal of a gaming management system, such as the gaming management system of FIG. 1, according to aspects of the present disclosure.

FIG. 2B illustrates a block diagram of a gaming terminal 202 of a gaming management system, such as the gaming management system of FIG. 1, according to aspects of the present disclosure. The "gaming machine" of FIG. 2B represents an example of a game board (e.g., game board 210 of FIG. 2A), the "hover board" represents an example of a companion board (e.g., companion board 212 of FIG. 2A), and the "SAS box" represents an example of a communication board (e.g., communication board 214 of FIG. 2A).

In the example of FIG. 2B, the gaming machine transmits data to the zero-power RAM (i.e., a memory module) as part of game play data collection. The data is passed between the gaming machine and the zero-power RAM over pins connecting the gaming machine and the hover board. The dual-port RAM reads the data as it is being passed to the zero-power RAM, copies the data sent to the zero-power RAM, and sends the copy of the data to the PIC microchip controller.

In examples, the zero-power RAM retains information for backup and supervision purposes of the gaming terminal 202. FIG. 2B illustrates two functional modules: the companion board module and the communication board module. The companion board module extracts information from the gaming terminal 202. It is attached to the gaming terminal's game board system bus and monitors data that is read from or written to the zero-power RAM. Information read by monitoring is stored to the dual-port RAM which is in turn accessed by the first microcontroller without influencing the data that is read to the dual-port RAM. Dual-port RAM may be utilized instead of scratch pad RAM, for example, to enable more reliable memory access. Implementing scratch pad RAM, for example, may cause data corruption if the RAM is accessed out of time. Dual-port RAM, in contrast, provides more reliable access (e.g., reads and writes) without data corruption. This information is filtered using techniques of gaming machine zero-power RAM data structures. The information is reported to the microprocessor of the communication board module at the initialization procedure and when a change of information occurs. In an example, communication is implemented using Inter-Integrated Circuit (I2C) bus, but any other suitable communication technique could be utilized.

The communication board module retains a local copy of some accounting information and can also process and respond to different events from the gaming machine or requests from SAS hosts (the central management system 121 of FIG. 1, for example) thus providing requested SAS functionality to two separate hosts using SAS protocol. Additionally it is capable of performing transaction of credits from the gaming terminal to the SAS host on selected SAS port or vice-versa. Currently implemented solution uses two different hardware modules, one for each functional module, but it could be also implemented on one hardware module.

The PIC microchip controller, which may represent any suitable microcontroller or processing resource, as described herein, receives the copy of the collected data and transmits the collected data to the SAS box. In examples, the PIC microchip controller utilizes an I2C connection between the hover board and the SAS box to communicate the data to the SAS box, although other communication techniques may be implemented.

The present disclosure provides gaming terminals with the ability to support SAS protocol without changing the hardware or software of the gaming terminal with two parts: reading data from system bus without changing the data and then storing this data in dual-port RAM for possible simultaneous access from the gaming terminal and our system while providing data to the communication board module, which provides SAS functionality to a SAS host.

Figure 3A:
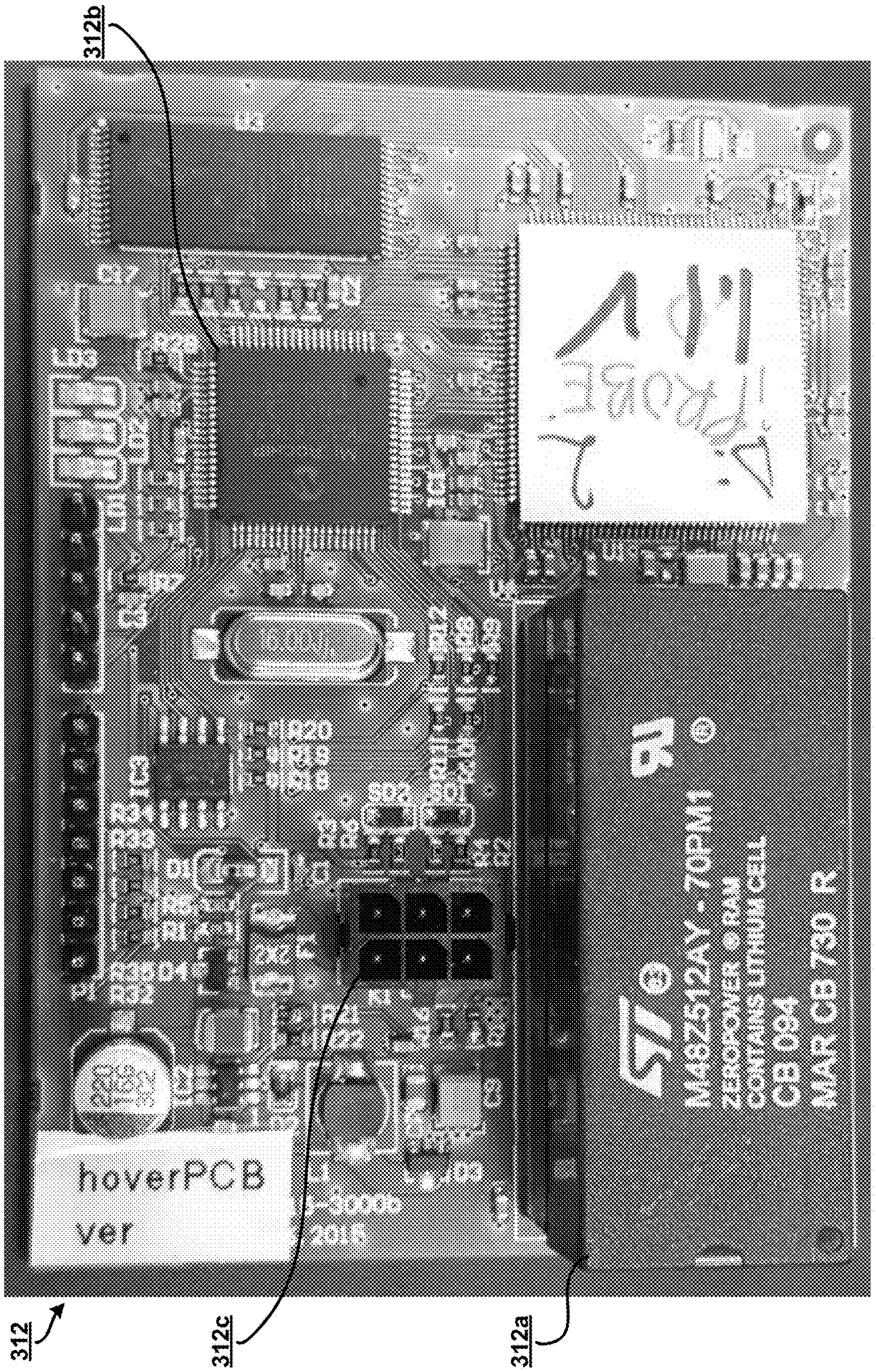
FIGS. 3A-3D illustrate various views of a companion board for a gaming board of a gaming terminal, such as the gaming terminal of FIG. 2A, according to aspects of the present disclosure.
Figure 3B:
Figure 3C:
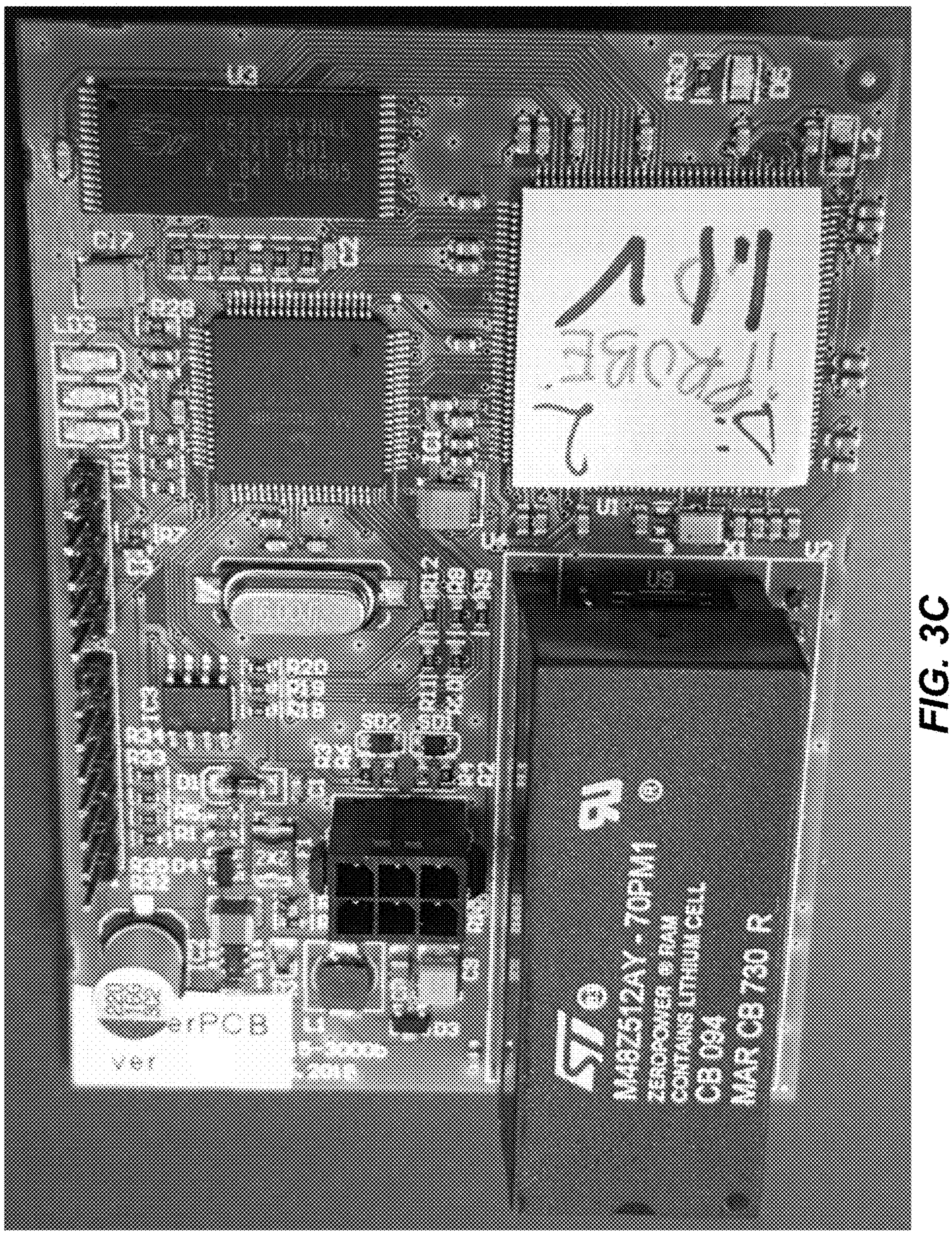
Figure 3D:
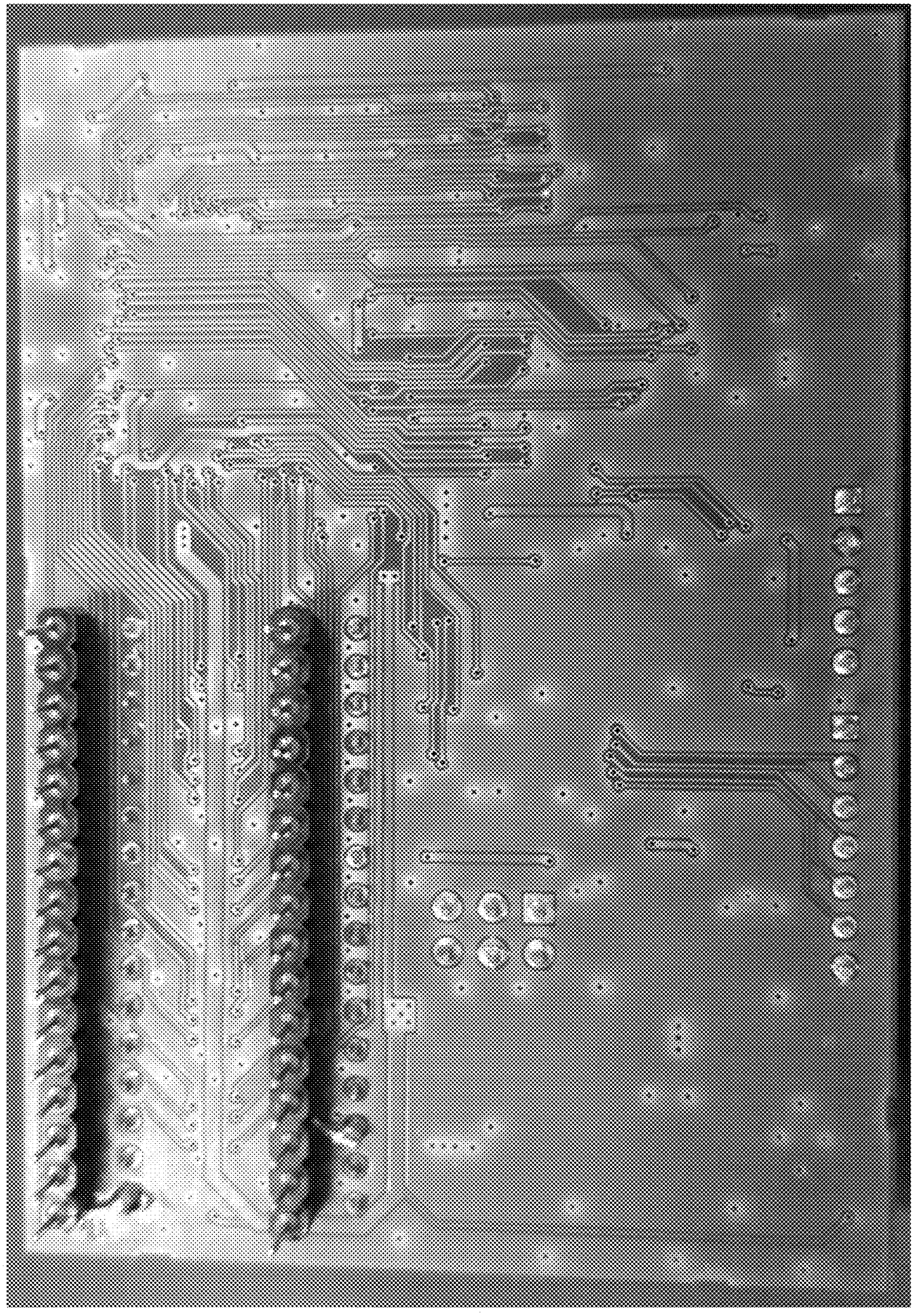
Figure 4A:
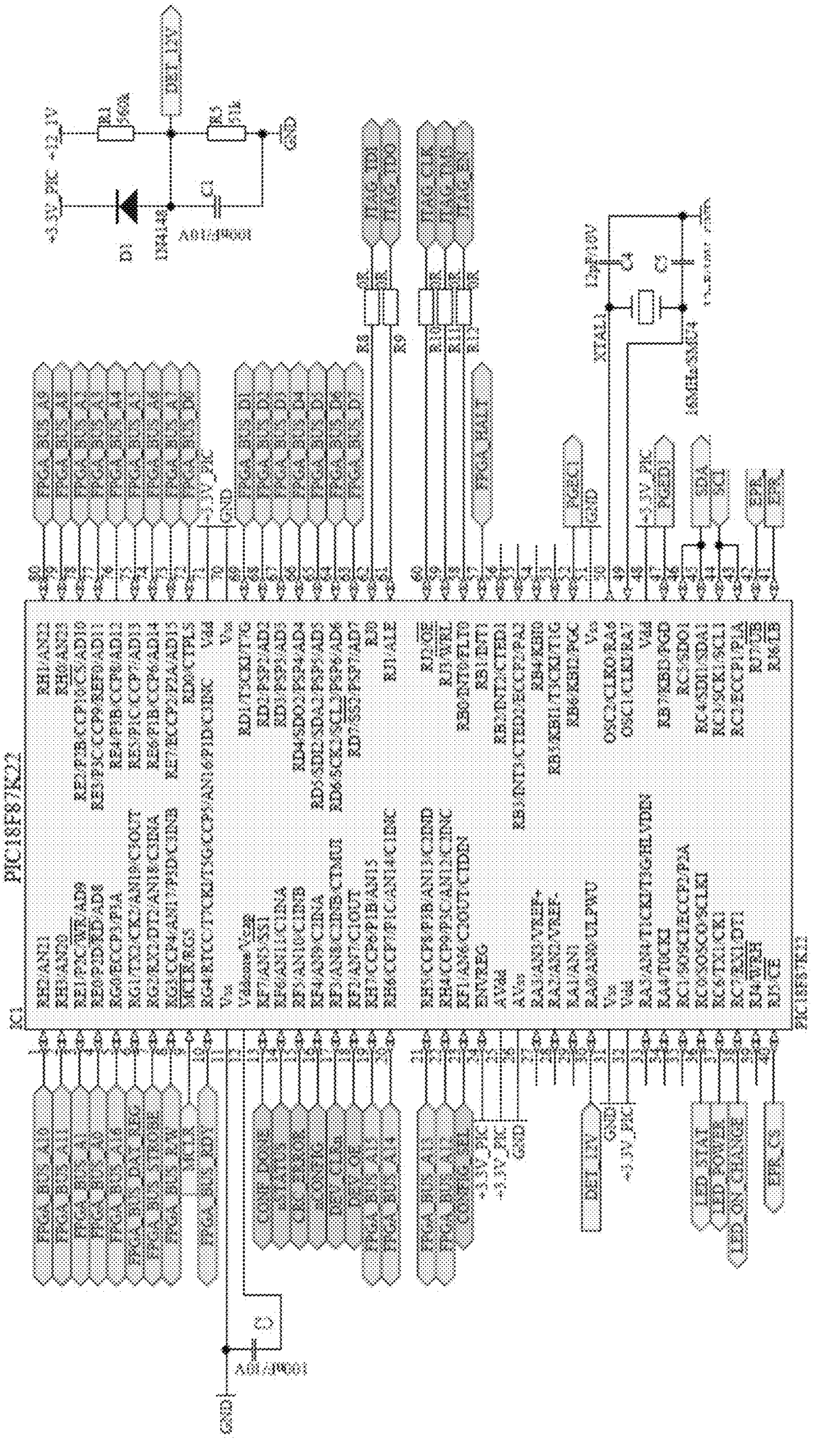
FIGS. 4A-4I illustrate circuit diagrams of the companion board of FIGS. 3A-3D, according to aspects of the present disclosure.
Figure 4B:
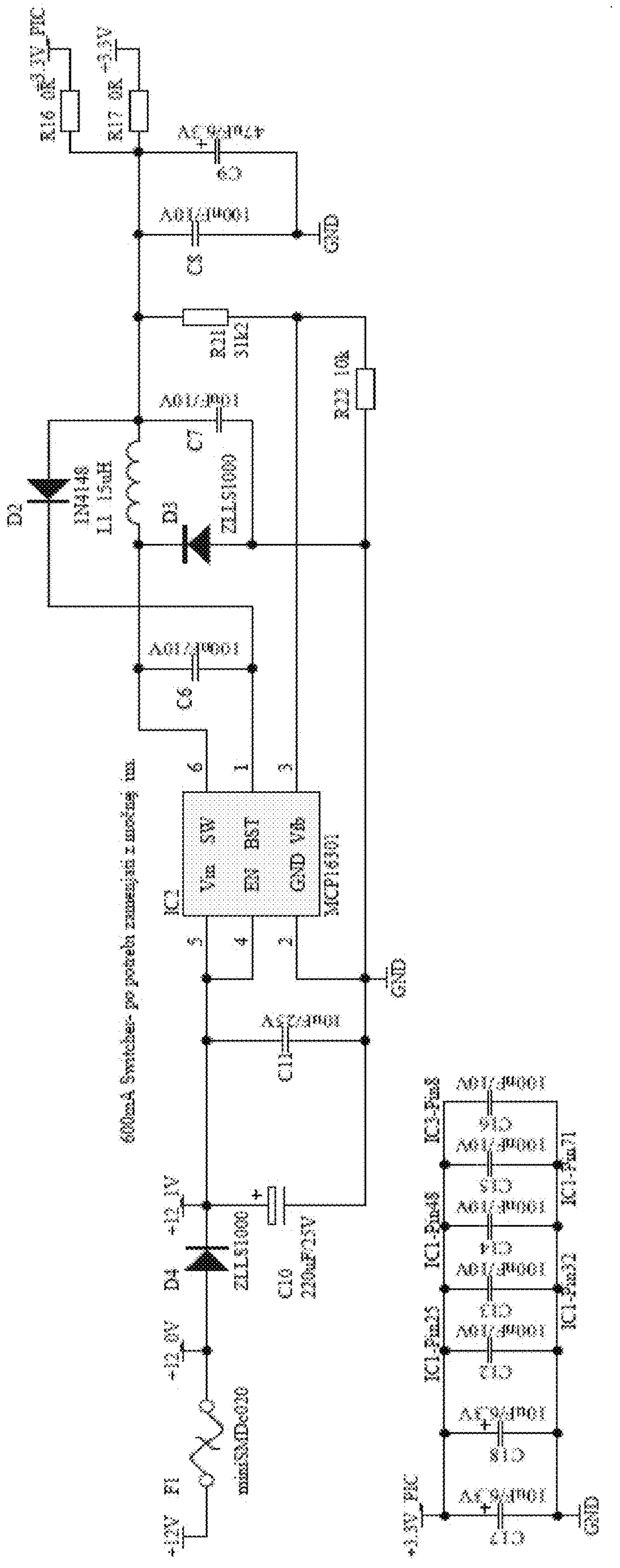
Figure 4C:
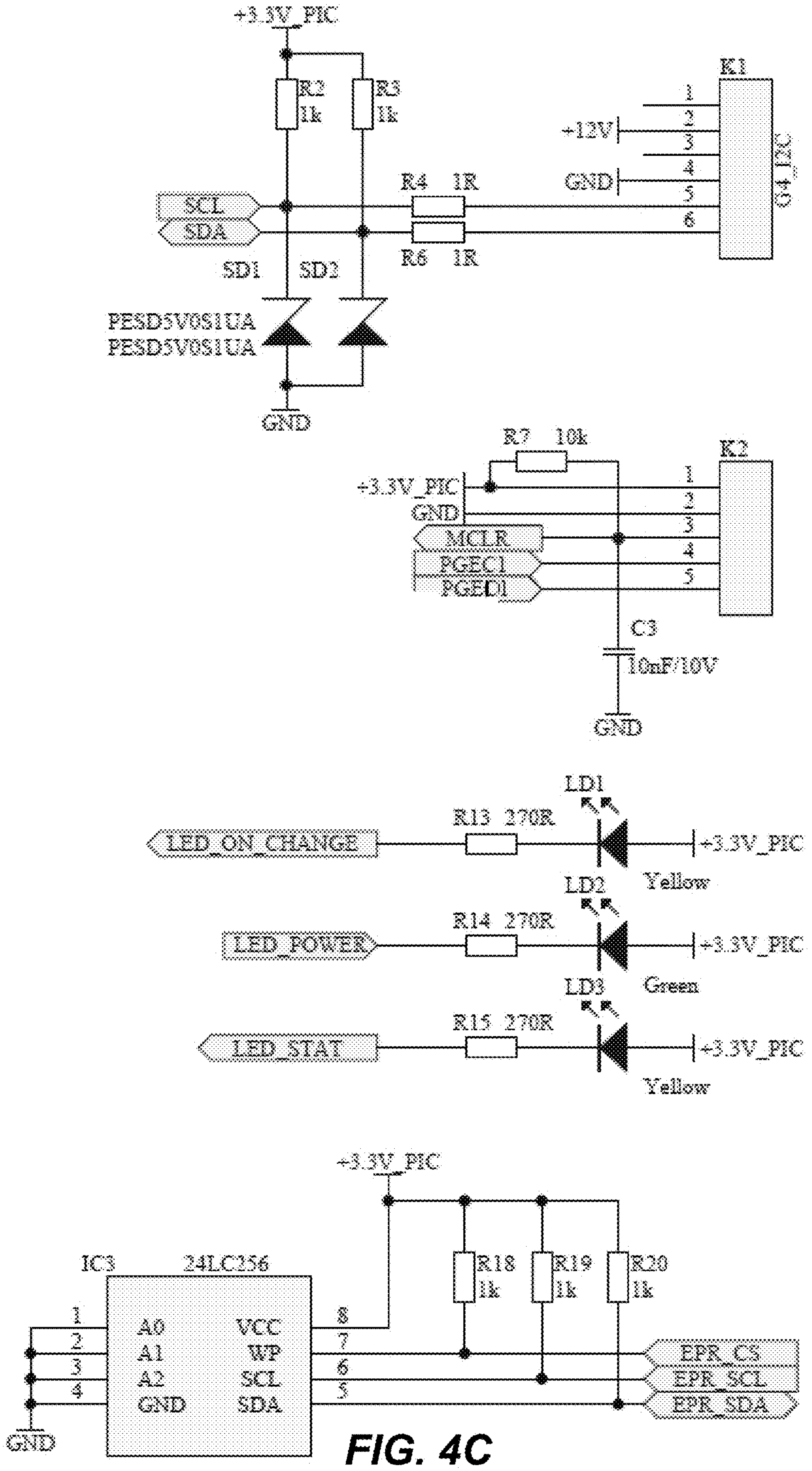
Figure 4D:
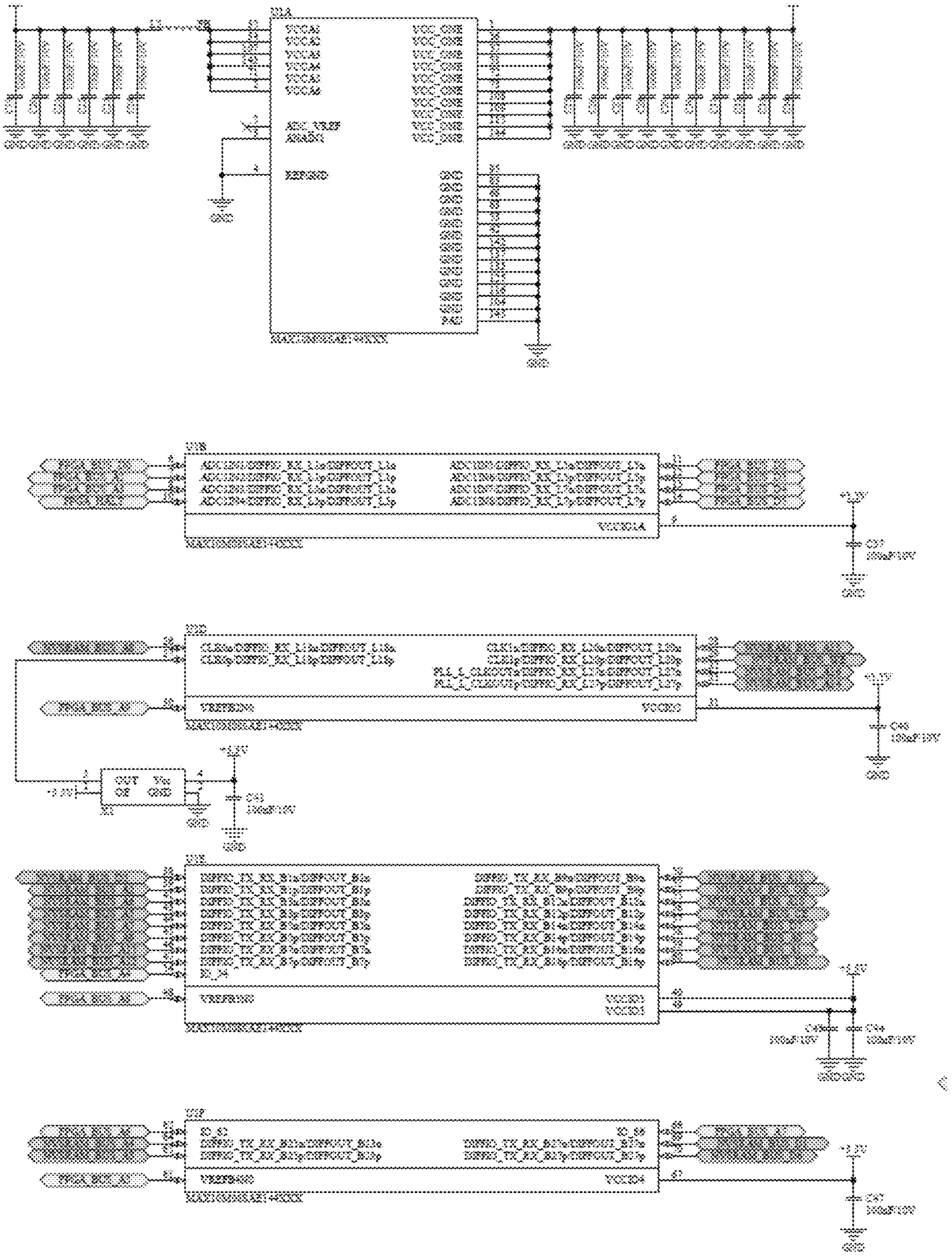
Figure 4E:
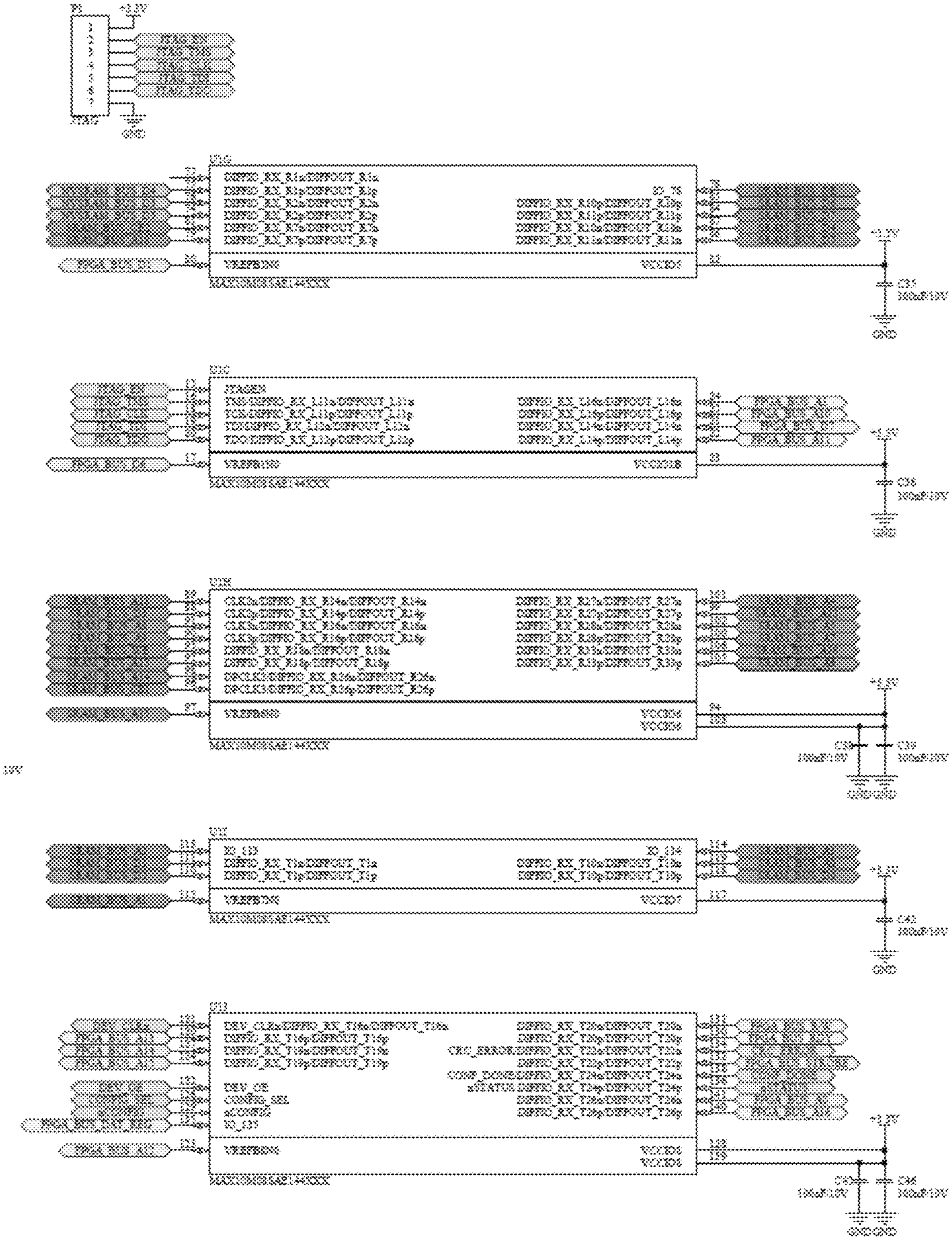
Figure 4F:
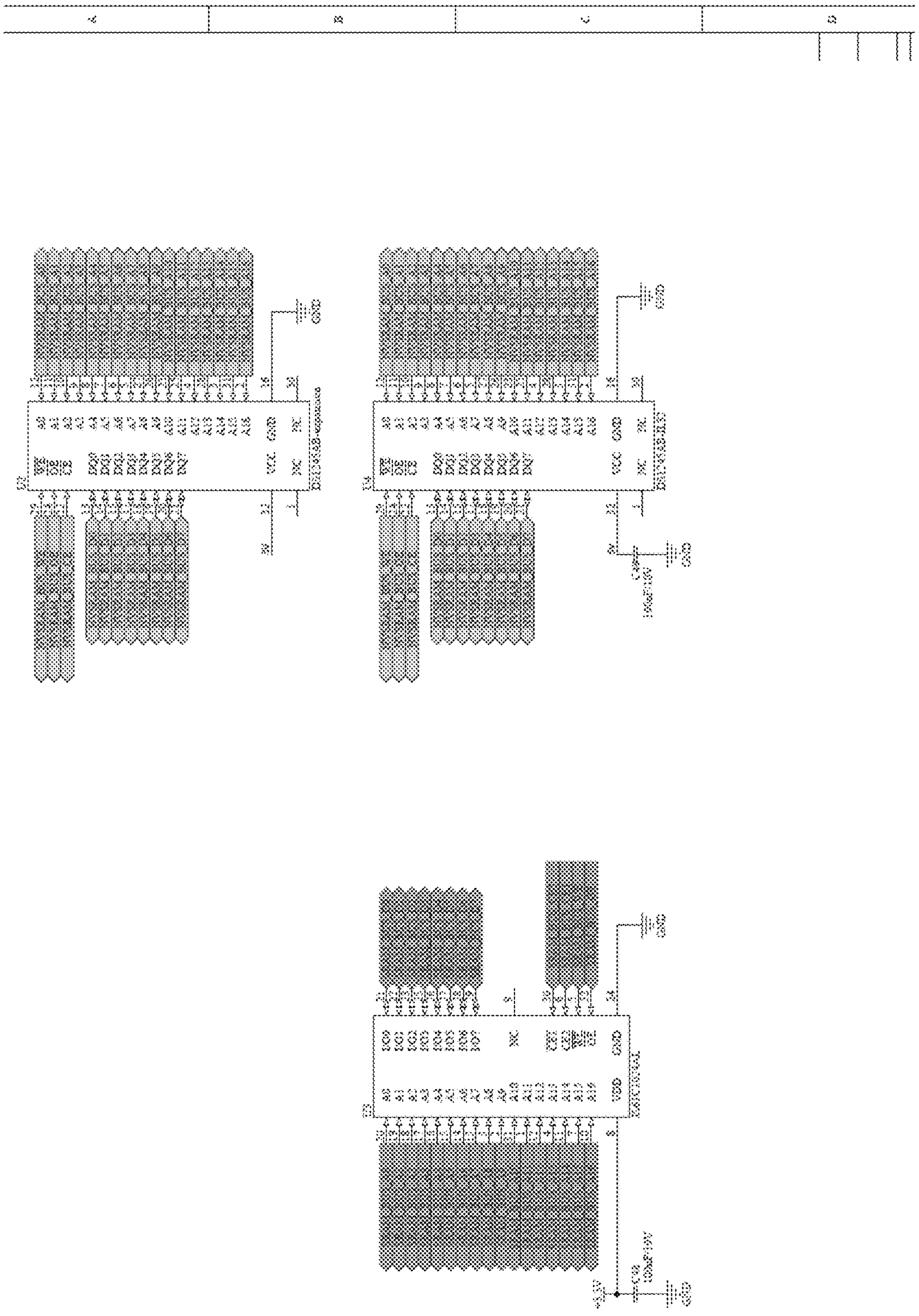
Figure 4G:
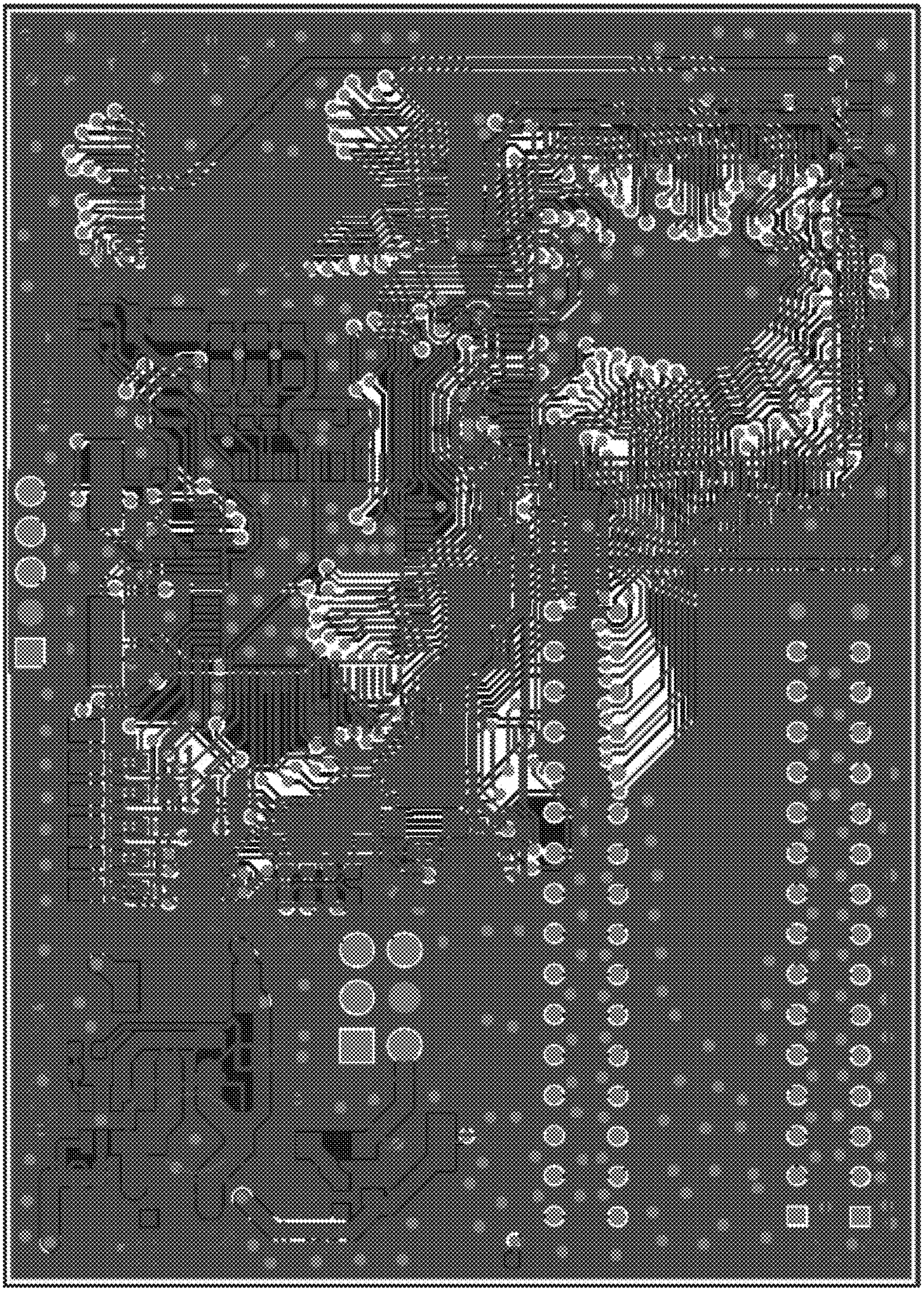
Figure 4H:
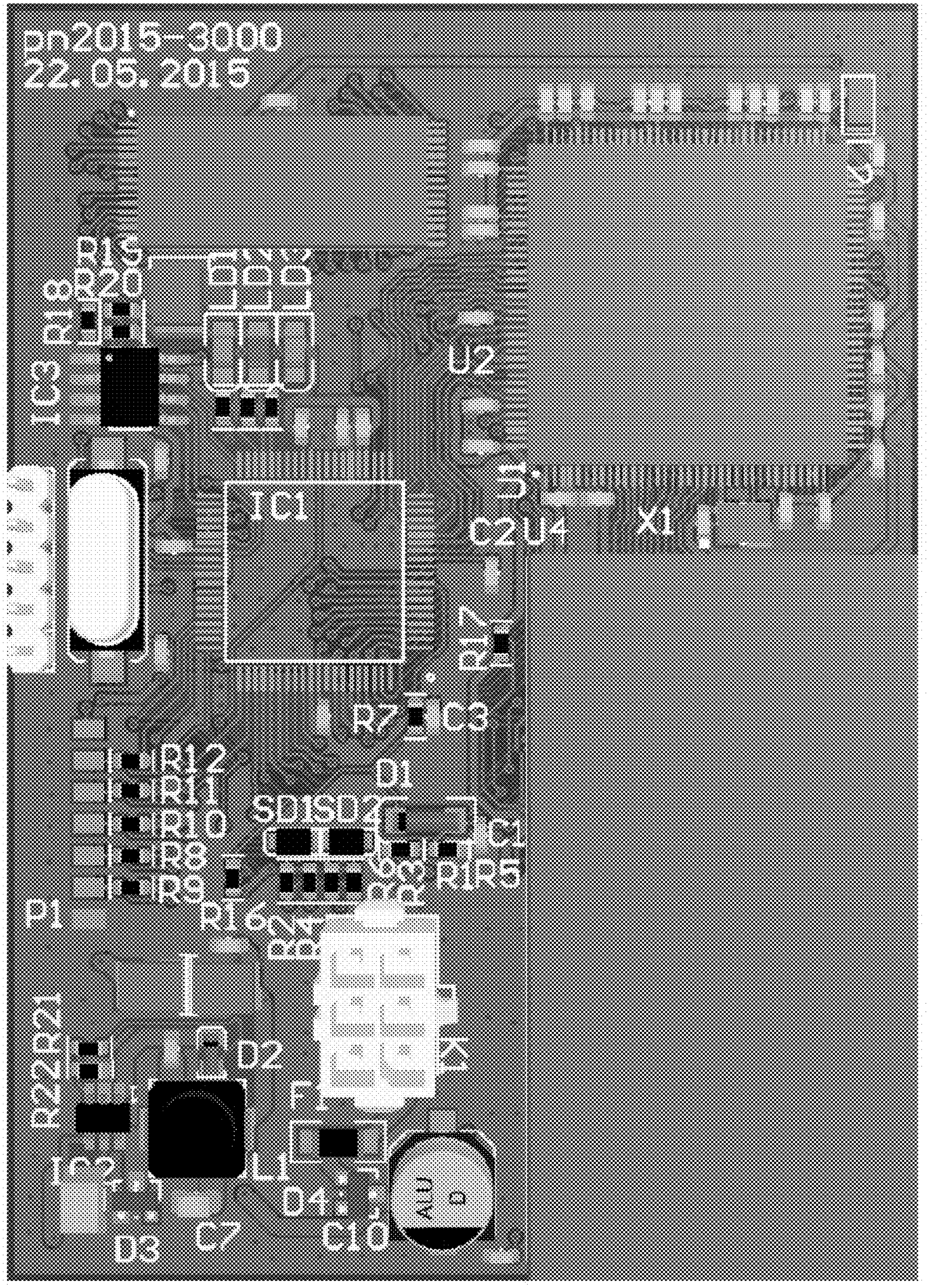
Figure 4I:
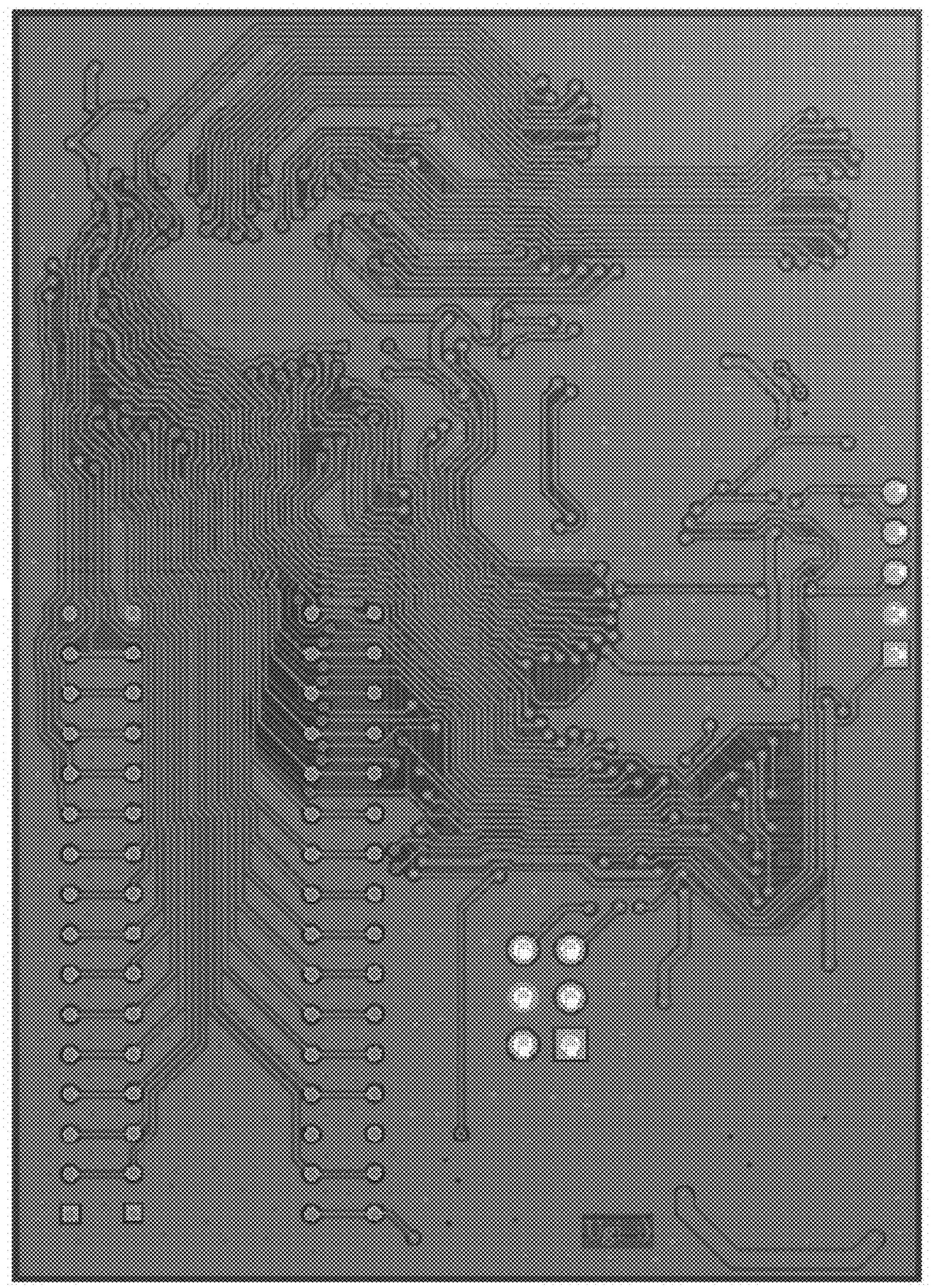

FIGS. 3A-3D illustrate various views of a companion board 312 for a gaming board of a gaming terminal, such as the gaming terminal of FIG. 2A, according to aspects of the present disclosure. FIG. 3A illustrates a top view of a companion board 312, which comprises a variety of components, such as a zero-power RAM 312*a*, a PIC microcontroller 312*b*, and an I2C interface 312*c*. FIGS. 3B and 3C illustrate additional top views of the companion board 312, and FIG. 3D illustrates a bottom view of the companion board 312.

FIGS. 4A-4I illustrate circuit diagrams of the companion board of FIGS. 3A-3D, according to aspects of the present disclosure.

Figure 5A:
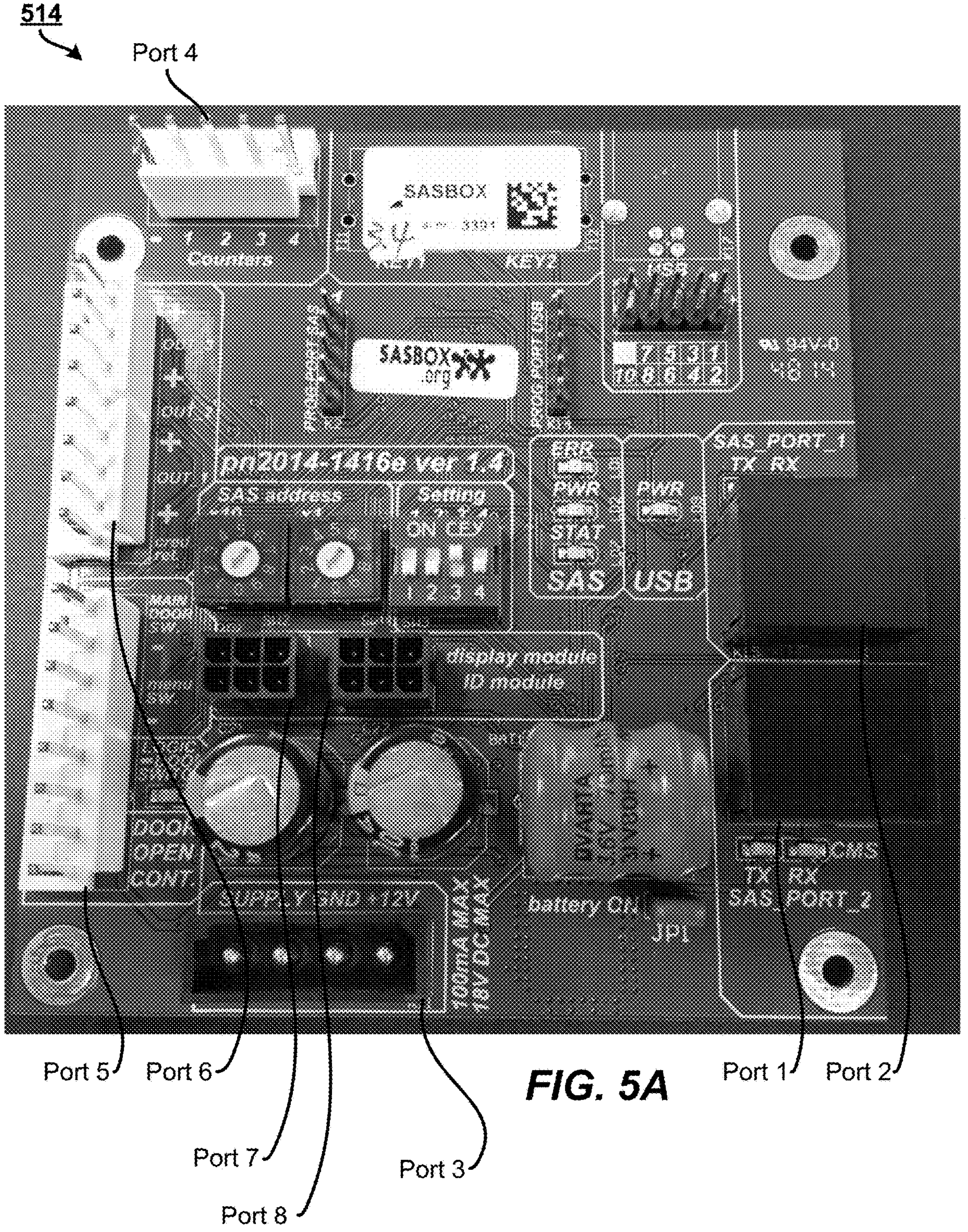
FIGS. 5A-5D illustrate various views of a communication board for a gaming board of a gaming terminal, such as the gaming terminal of FIG. 2A, according to aspects of the present disclosure.
Figure 5B:
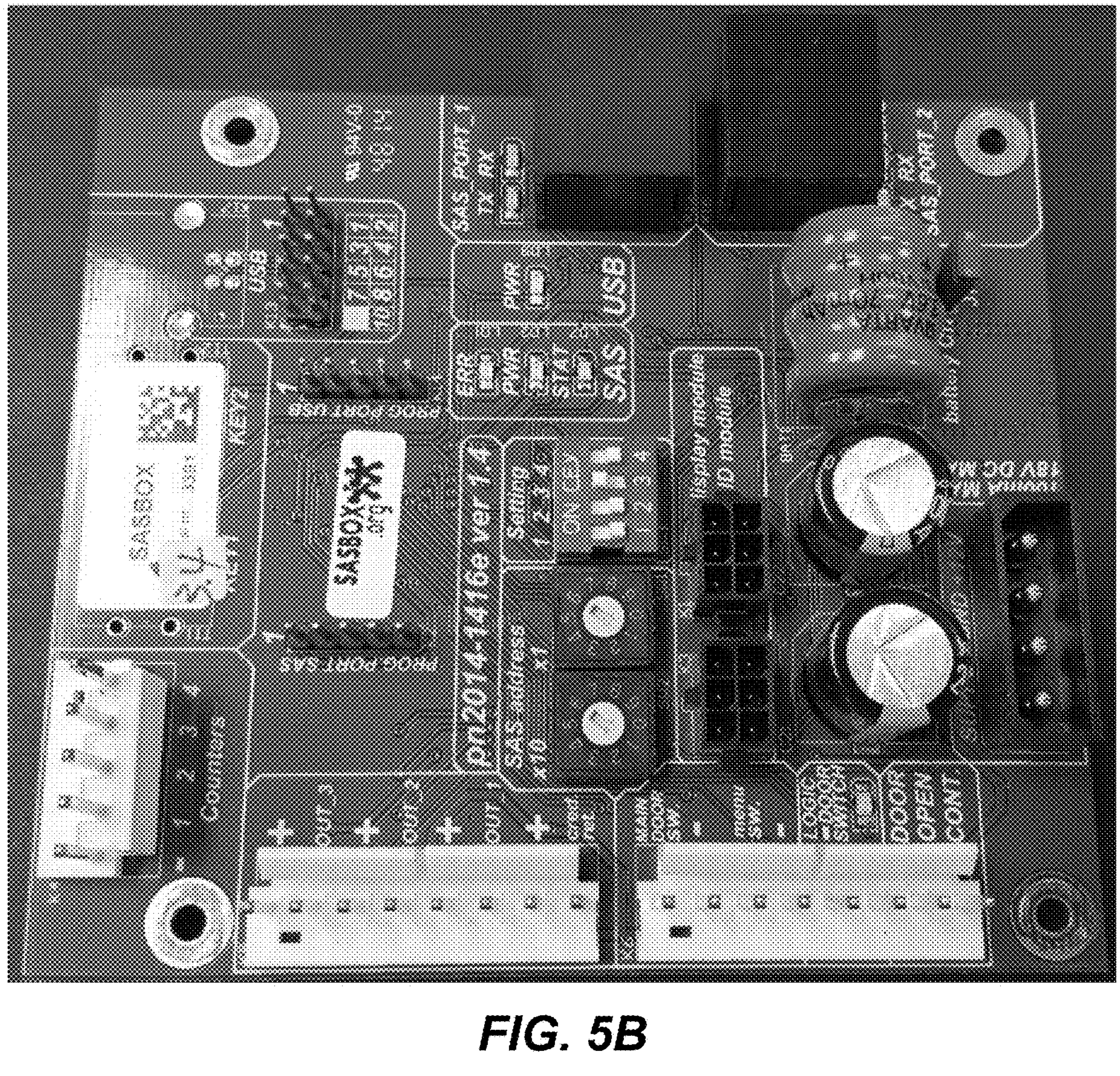
Figure 5C:
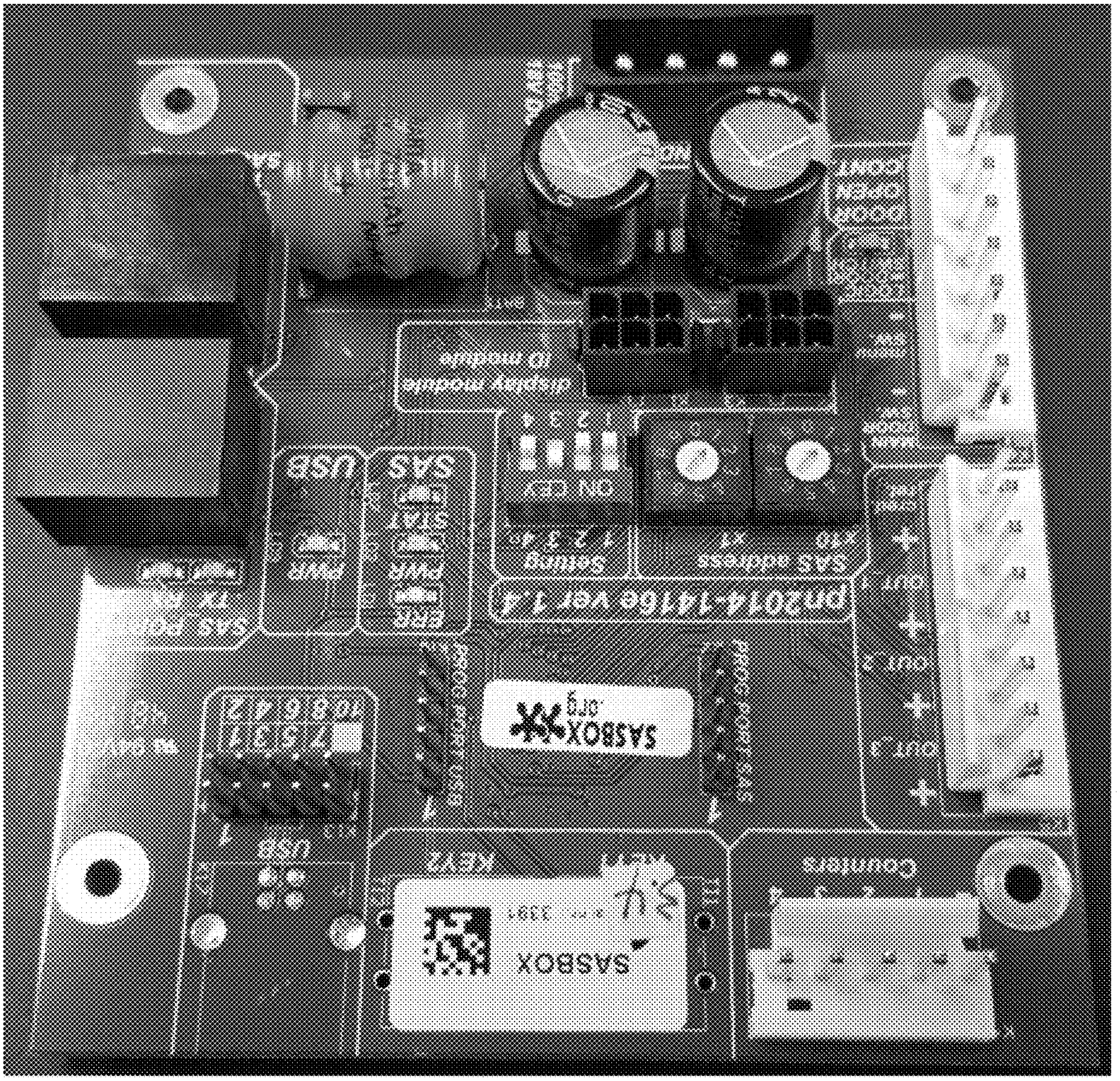
Figure 5D:
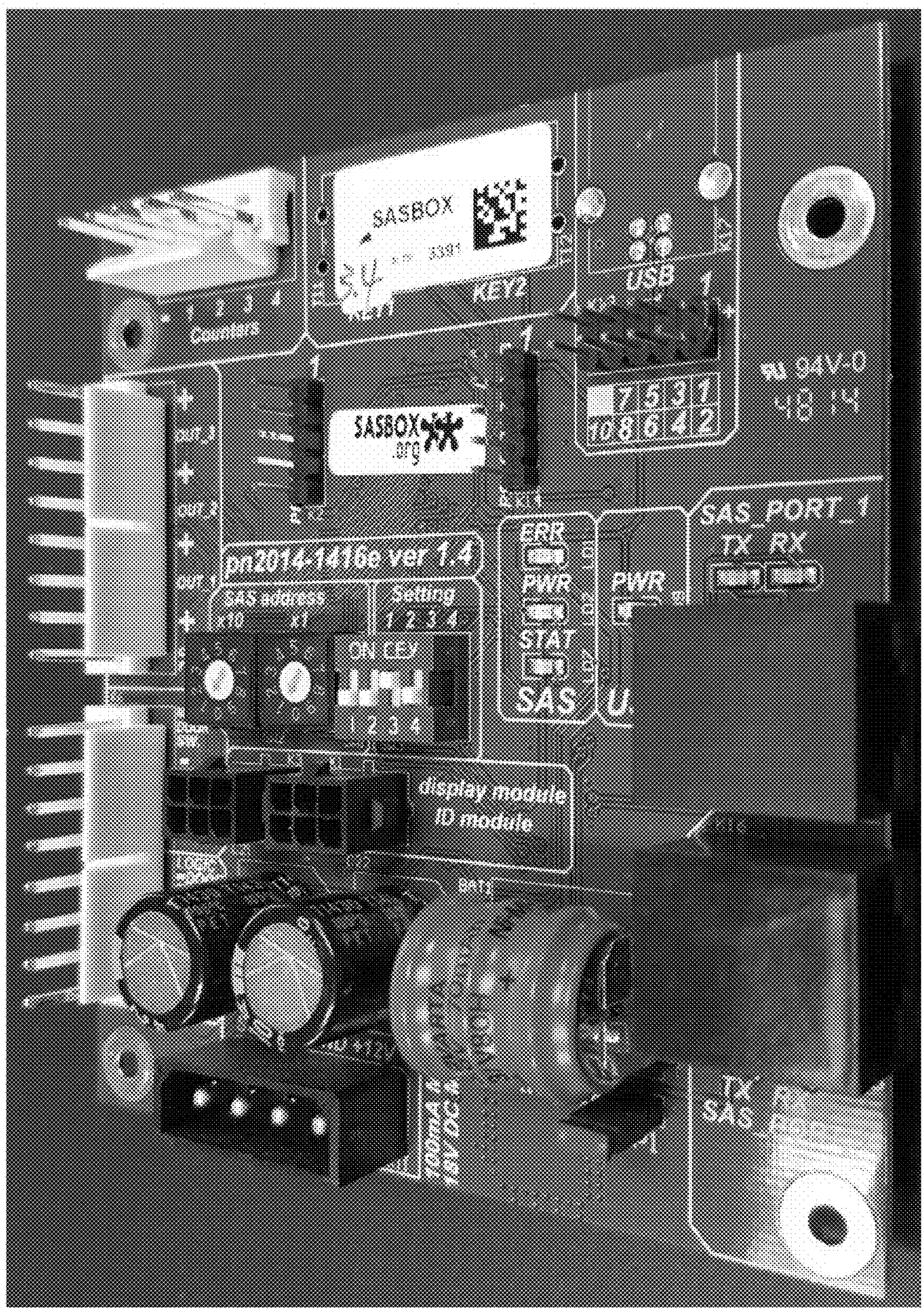
Figure 6A:
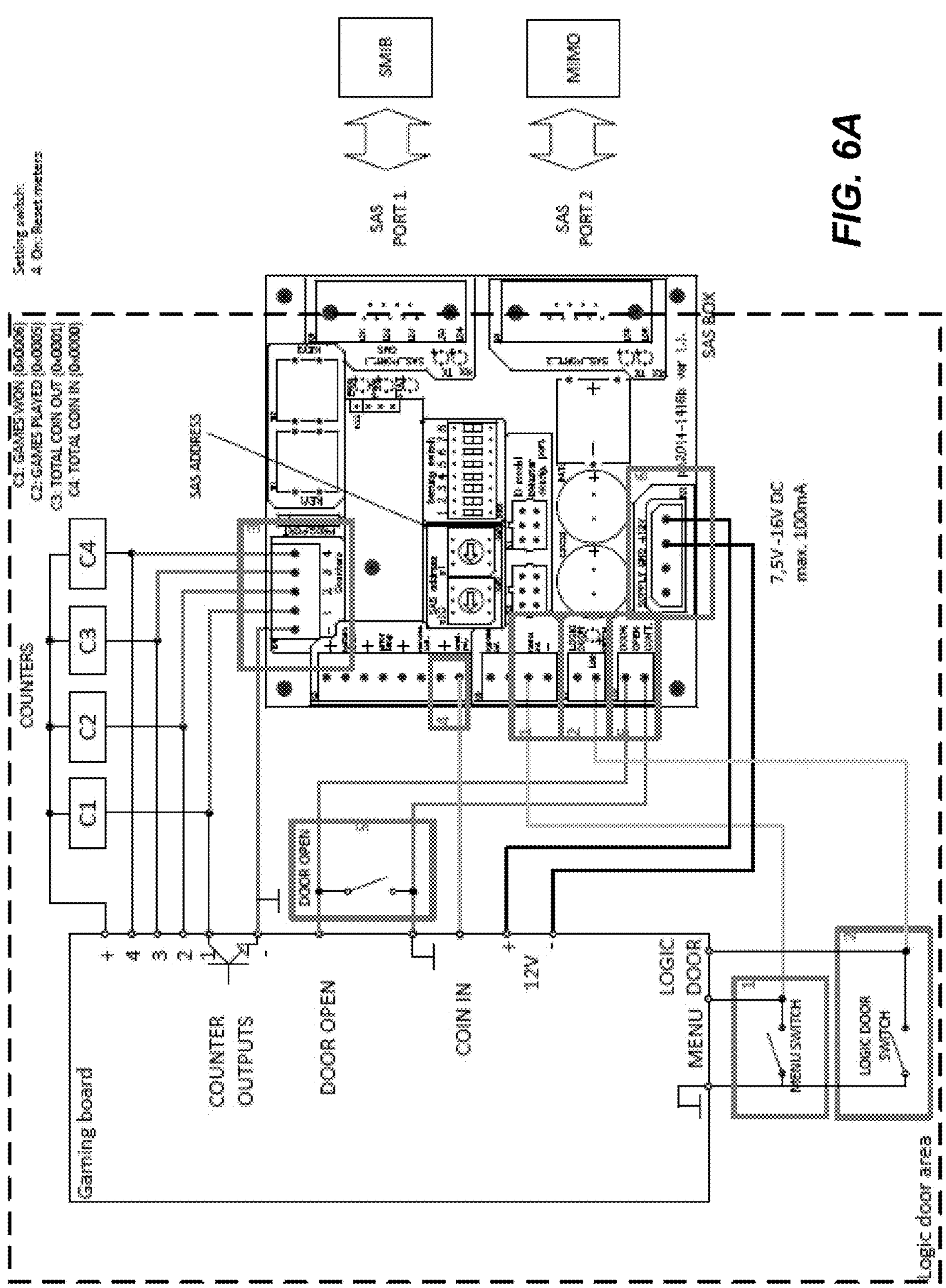
FIGS. 6A-6G illustrate circuit diagrams of the communication board of FIGS. 5A-5D, according to aspects of the present disclosure.
Figure 6B:
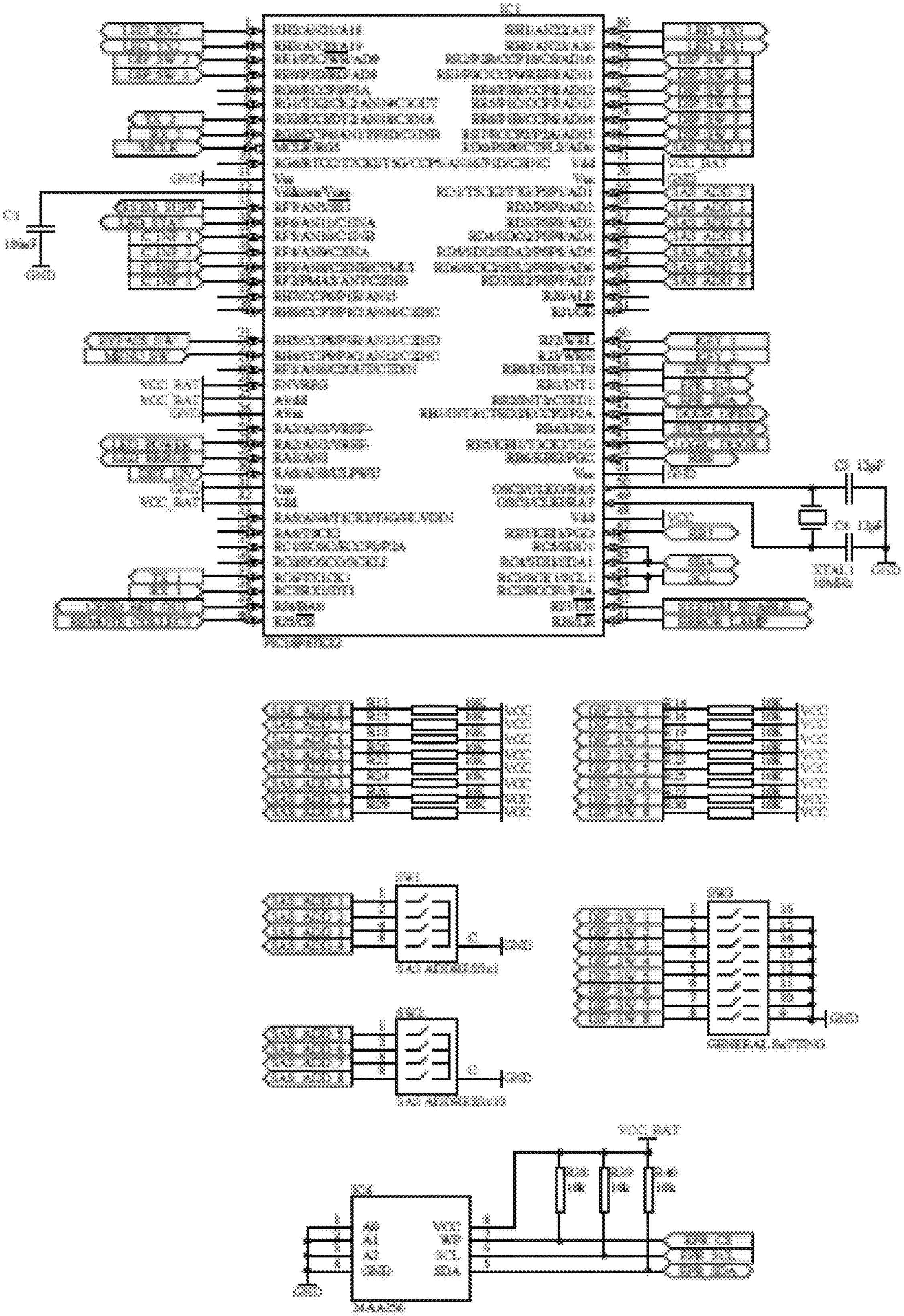
Figure 6C:
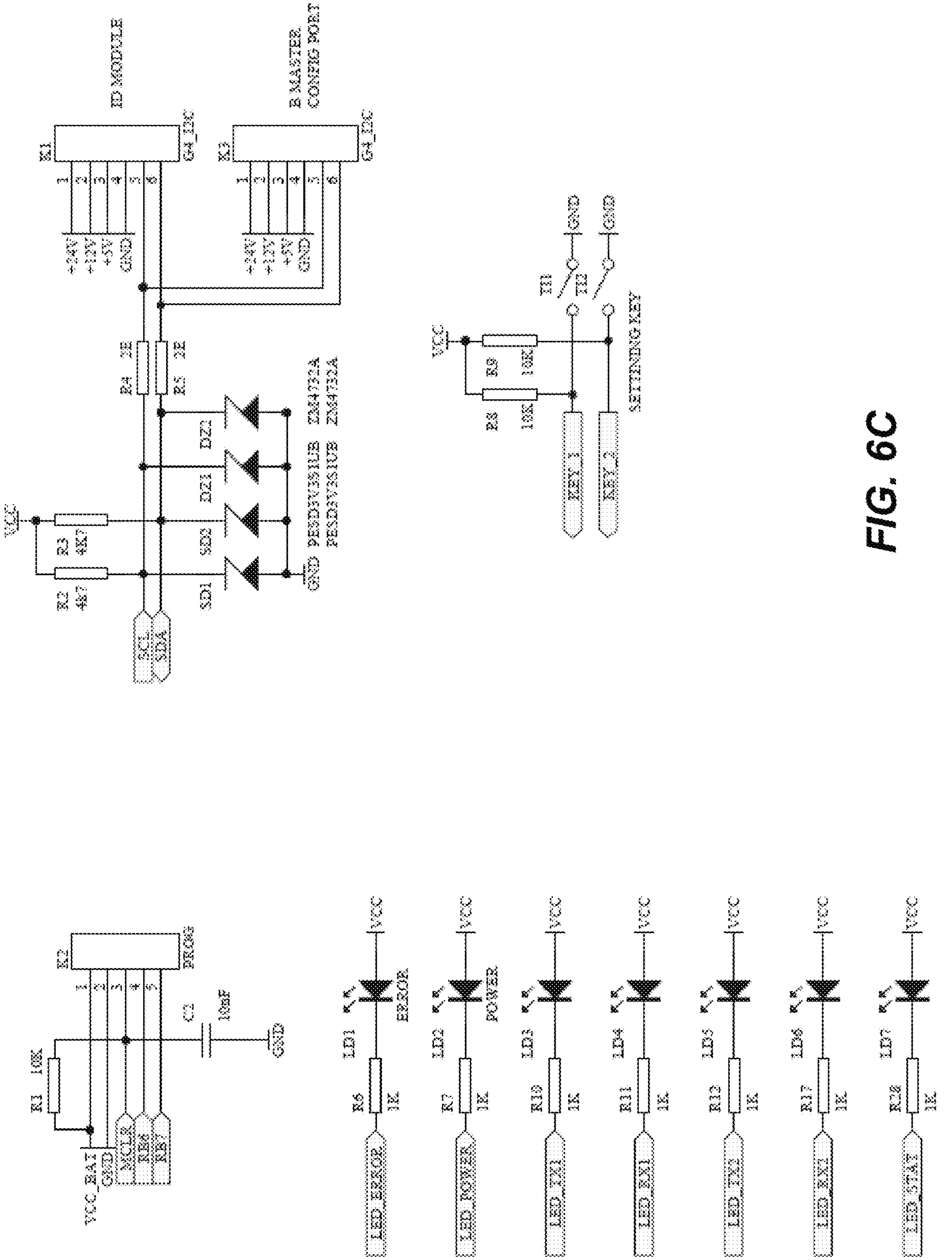
Figure 6D:
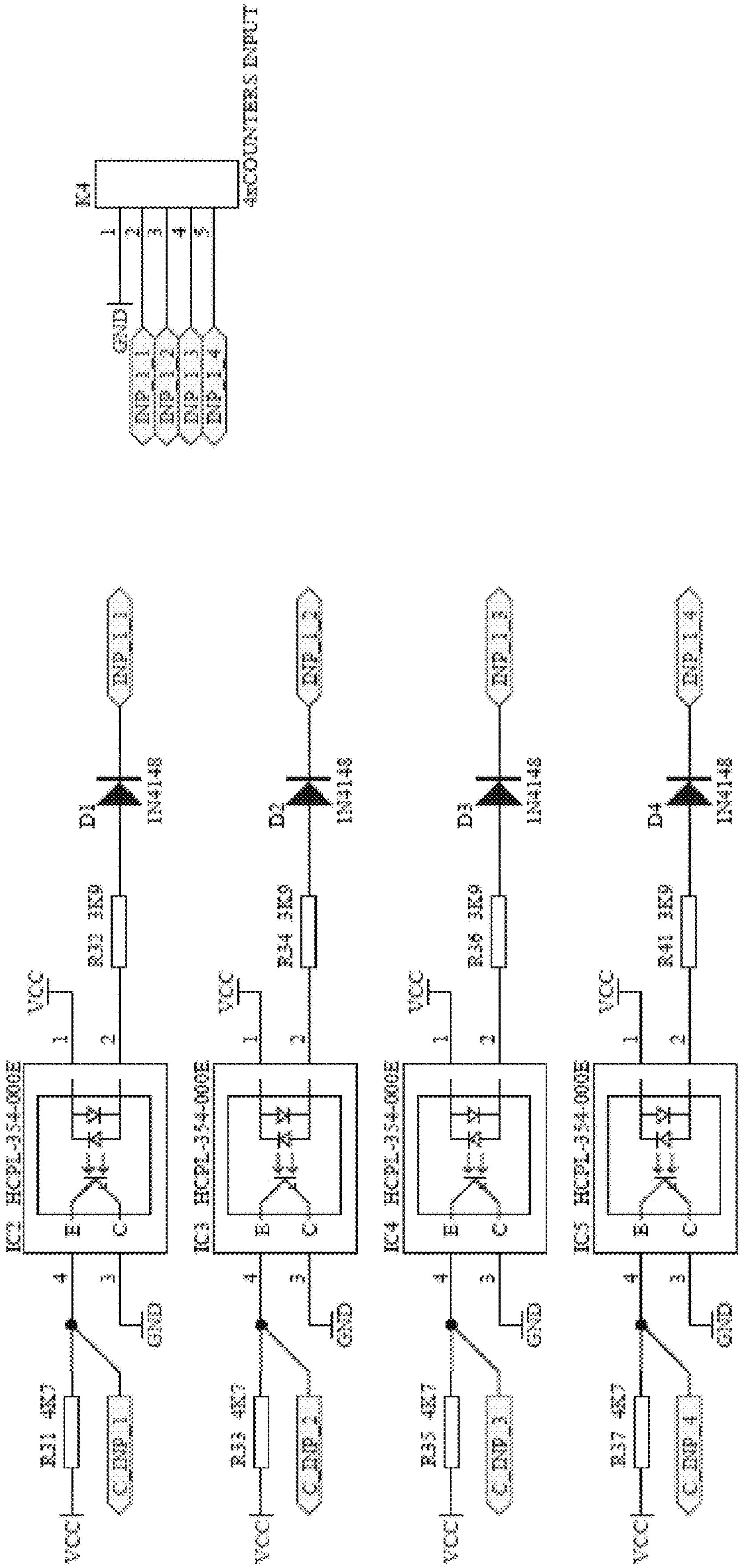
Figure 6E:
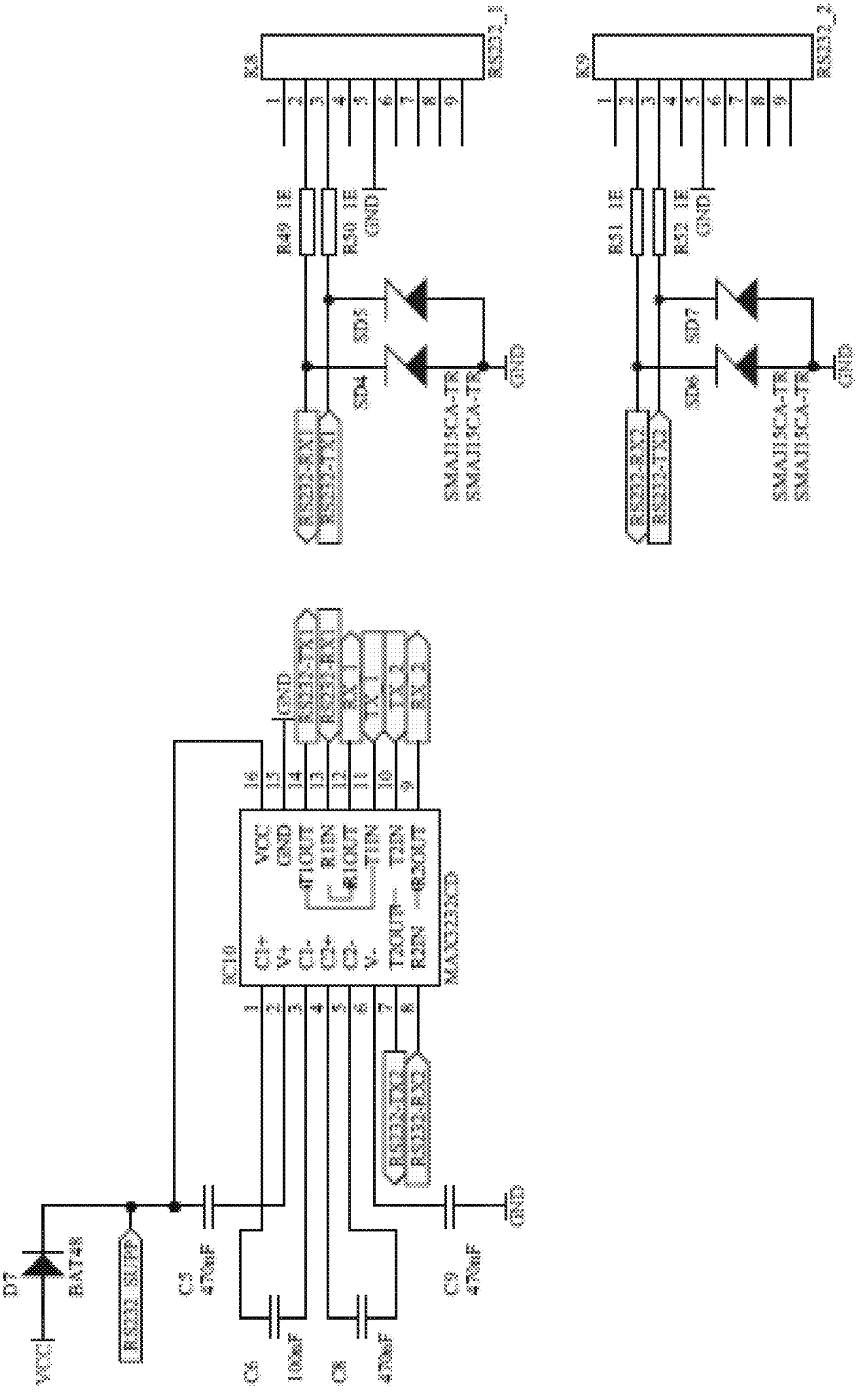
Figure 6F:
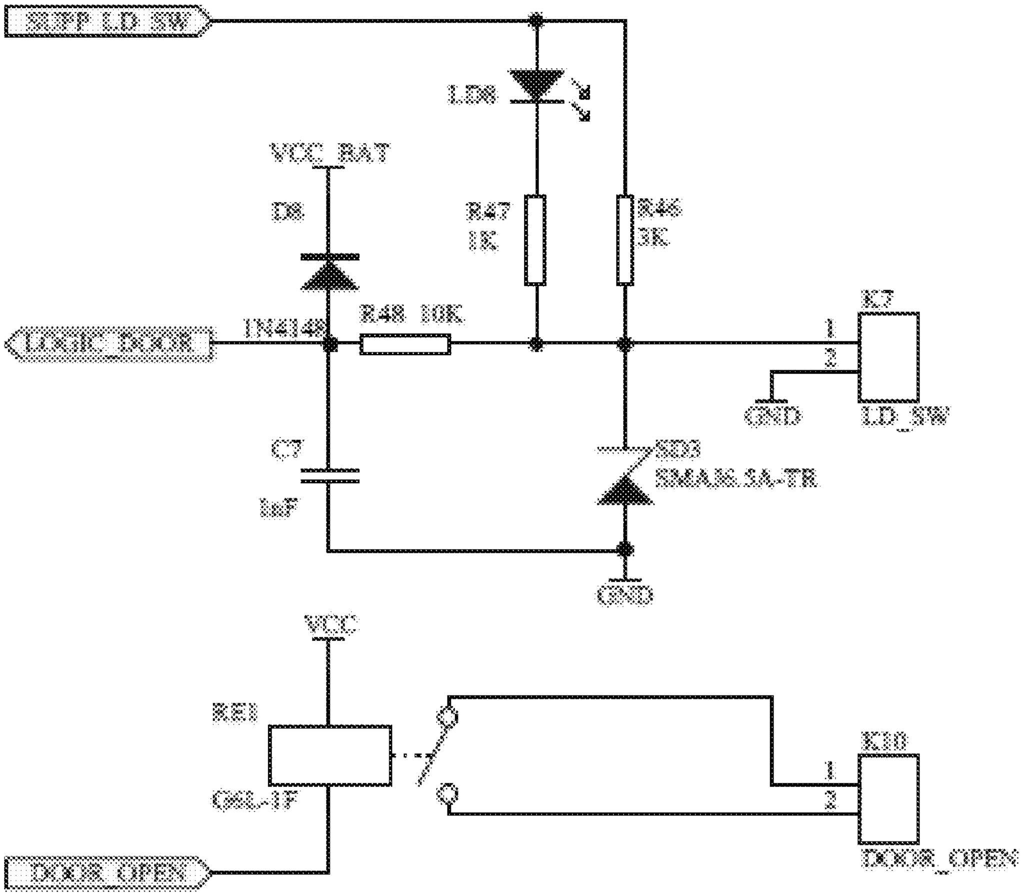
Figure 6G:
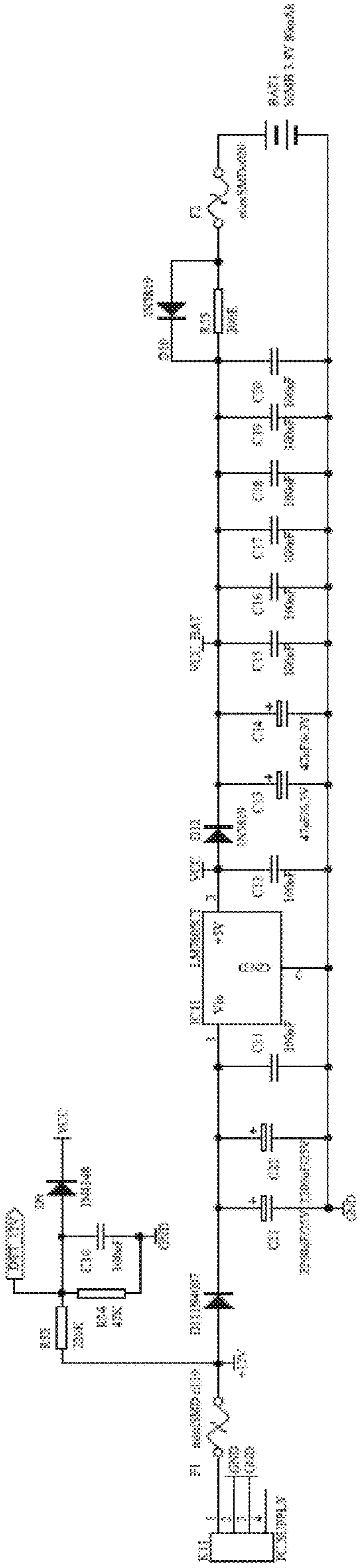

FIGS. 5A-5D illustrate various views of a communication board 514 for a gaming board of a gaming terminal, such as the gaming terminal of FIG. 2A, according to aspects of the present disclosure. FIG. 5A illustrates a top view of a communication board 514, which comprises a variety of components, such as port 1 through port 8. In particular, port 1 communicatively couples the communication board 514 to a front end computing system (e.g., front end computing system 120*b* of FIG. 1). Port 2 communicatively couples the communication board 514 to a legacy front end computing system (e.g., central management system 121 of FIG. 1). Port 3 enables the communication board 514 to receive power, such from a battery or power supply. Port 4 communicatively couples the communication board 514 to a plurality of physical counters or meters (e.g., meters 1 through meters 4 of FIG. 2A) and a game board (e.g., game board 210 of FIG. 2A). Ports 5 and 6 communicatively couple the communication board 514 to additional devices, such as sensors for determining the status of a door and/or a door lock (e.g., whether the door and/or door lock is open or close, when the door and/or door lock is opened or closed, etc.), sensors for monitoring coin/credit input, and the like. Port 7 communicatively couples the communication board 514 to virtual (e.g., software) counters or meters (illustrated in FIG. 2C). Port 7 also communicatively couples the communication board 514 to a companion board (e.g., companion board 212 of FIG. 2A).

In examples, using port 8, the communication board 512 may also be coupled to a player tracking module, which may comprise a sensor, such as a radio frequency ID (RFID) sensor, a magnetic card reader, etc., to receive input from a player loyalty card to identify a player, receive credits from the player, transfer credits to the player, etc. The received information may be transmitted to a player tracking module of the front end computing system. Ports 7 and 8 may utilize I2C communication protocols, although other suitable techniques may be implemented.

FIGS. 6A-6G illustrate circuit diagrams of the communication board of FIGS. 5A-5D, according to aspects of the present disclosure.

Figure 7:
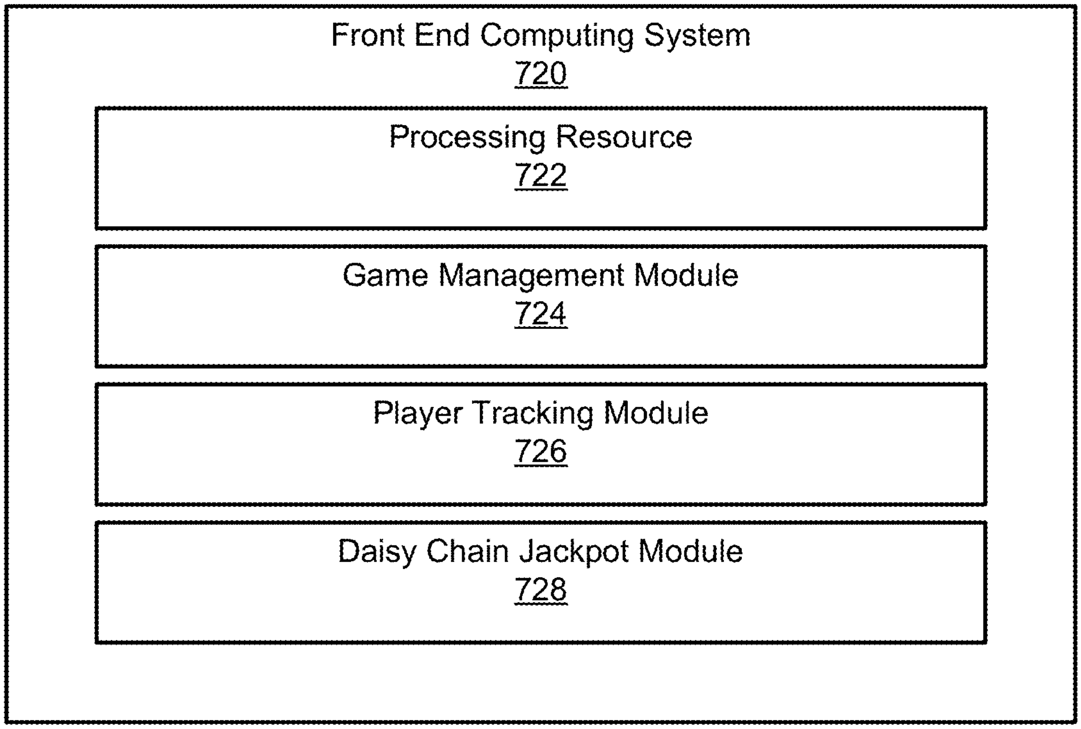
FIG. 7 illustrates a front end computing system, such as the front end computing system of FIG. 1.

FIG. 7 illustrates a front end computing system 720, such as front end computing system 120*a* and/or 120*b* of FIG. 1. The computing system 720 may be referred to herein as an "ICAGE" system or a POS system. The computing system 720 may include a processing resource 722 that represents generally any suitable type or form of processing unit or units capable of processing data or interpreting and executing instructions. The processing resource 722 may be one or more central processing units (CPUs), microprocessors, and/or other hardware devices suitable for retrieval and execution of instructions. The instructions may be stored, for example, on a memory resource (not shown), such as a computer-readable storage medium, which may include any electronic, magnetic, optical, or other physical storage device that store executable instructions. Thus, the memory resource may be, for example, random access memory (RAM), electrically-erasable programmable read-only memory (EPPROM), a storage drive, an optical disk, and any other suitable type of volatile or non-volatile memory that stores instructions to cause a programmable processor (e.g., the processing resource 722) to perform the techniques described herein. In examples, the memory resource includes a main memory, such as a RAM in which the instructions may be stored during runtime, and a secondary memory, such as a nonvolatile memory in which a copy of the instructions is stored.

The computing system 720 may include various components, modules, engines, etc., such as a game management module 724, a player tracking module 726, and a daisy chain jackpot module 728, which are described in more detail below in Appendix C. In particular, the game management module 724 enables the computing system 720 to receive game play data from the gaming terminals and manage data relating thereto. The player tracking module 726 manages players through player authorization and player fund tracking. The daisy chain jackpot module 728 manages a rolling daisy chain jackpot. Games played on the individual gaming terminals may contribute to a daisy chain jackpot tracked by the computing system 720, which may be paid out at random to a game player.

In examples, the computing system 720 interacts with a remote computing system such as back end computing system 142 of FIG. 1, which facilitates global game management across various locations. This enables players to transfer credits, loyalty, etc., between locations by enabling the various front end computing systems, such as computing system 720 (and front end computing systems 102*a* and 102*b* of FIG. 1) to communicate, such as via a network (e.g., network 140 of FIG. 1). The back end computing system (e.g., back end computing system 142) may manage additional aspects of the present application on a global level across multiple front end computing systems and/or across multiple locations, including game data tracking and management, daisy chain jackpot management, player tracking, and the like.

Although not shown in FIG. 7, it should be appreciated that the computing system 720 may include additional components. For example, the computing system 720 may include a display. The display may be or include a monitor, a touchscreen, a projection device, and/or a touch/sensory display device. The display may display text, images, and other appropriate graphical content. The computing system 720 may also include a network interface to enable the computing system 720 to communicate with other computing systems directly and/or via a network and with gaming terminals directly and/or via a network. The computing system 720 may also include any suitable input and/or output device, such as a mouse, keyboard, printer, external disk drive, touchscreen, microphone, or the like. The computing system 720 may also include an antenna (not shown) to wirelessly transmit and/or receive signals, commands, and/or data to and from other devices.

It should be understood that conditional language, such as, among others, "can," "could," "might," or "may," unless specifically stated otherwise, or otherwise understood within the context as used, is generally intended to convey that certain examples include, while other examples do not include, certain features, elements and/or steps. Thus, such conditional language is not generally intended to imply that features, elements, and/or steps are in any way required for one or more particular examples or that one or more particular examples necessarily include logic for deciding, with or without user input or prompting, whether these features, elements and/or steps are included or are to be performed in any particular example.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method of monitoring a gaming terminal comprising a gaming board, the method comprising steps of:

removing a memory module from a connector of the gaming board;

installing a companion board on the gaming board in the connector from which the memory module was removed;

installing the memory module on the companion board;

intercepting, by the companion board, data regarding various aspects of game play at the gaming terminal, the data transferred between a processing resource of the gaming board and the memory module, the companion board physically interposed between the gaming board and the memory module and configured to read the data as it is passed between the gaming board and the memory module over pins electrically connecting the gaming board to the memory module through the companion board, the companion board further configured to allow the gaming board and memory module to operate as if the companion board were not present;

transmitting, by the companion board, the data to a communication board utilizing a first protocol; and transmitting, by the communication board, the data from the communication board to a monitoring system utilizing a second protocol.

2. The method of claim 1, wherein the companion board is further configured to duplicate changes in information stored in the memory module to a dual port RAM of the companion board.

3. The method of claim 1, further comprising steps of:

determining, by the companion board, that relevant information in the memory module has changed; and upon determining that relevant information has changed, transmitting, by the companion board, the changed information to the communications board.

4. The method of claim 3, wherein the relevant information comprises values of virtual meters regarding different aspects of the game play.

5. The method of claim 4, wherein the virtual meters comprise one or more of total coins in, total coins out, total jackpot credits, total cancelled credits, total hand pay cancelled credits, games played, and games won.

6. The method of claim 1, wherein the second protocol comprises the standard Slot Accounting System ("SAS") protocol.

7. The method of claim 1, further comprising the step of:

receiving, by the communication board, signals regarding meters or events directly from the game board, and transmitting data regarding the meters or events utilizing the second protocol.

8. The method of claim 1, further comprising the step of:

receiving, by the communications board, a request from the monitoring system via the second protocol; and responding, by the communications board, to the request with the data utilizing the second protocol.

9. An apparatus for monitoring a legacy gaming terminal, the apparatus comprising:

a companion board physically installed in a gaming board of the legacy gaming terminal in a socket from which a memory module from the gaming board was removed, the memory module reinstalled onto the companion board, the companion board configured to intercept data regarding various aspects of game play at the gaming terminal passed between the gaming board and the memory module over pins electrically connecting the gaming board to the memory module through the companion board, the companion board further configured to allow the gaming board and memory module to operate as if the companion board were not present; and a communications board communicatively coupled to the companion board and configured to receive the data from the companion board and transmit the data to a monitoring system utilizing the standard Slot Accounting System ("SAS") protocol.

10. The apparatus of claim 9, wherein the companion board is communicatively coupled to the communications board via an Inter-Integrated Circuit ("I2C") bus connection.

11. The apparatus of claim 9, wherein the companion board comprises a dual port RAM and is further configured to duplicate changes in the data stored in the memory module to the dual port RAM.

12. The apparatus of claim 9, wherein the companion board is further configured to determine that relevant information in the memory module has changed, and, upon determining that relevant information has changed, transmit the changed information to the communications board.

13. The apparatus of claim 12, wherein the relevant information comprises values of virtual meters regarding different aspects of the game play.

14. The apparatus of claim 9, wherein the communication board comprises at least two ports for communicating with both a central management system and a front-end computing system utilizing the SAS protocol.

15. A non-transitory computer-readable storage medium storing instructions that, when executed by a processing resource on a companion board, cause the processing resource to:

detect a change of information in a memory module of a gaming board of a gaming terminal, the companion board physically installed on the gaming board between the gaming board and the memory module, the memory module having been removed from the gaming board and reinstalled on the companion board, the companion board configured to intercept writes of the information to the memory module by the processing resource as the information passes over pins directly electrically connecting the gaming board to the memory module through the companion board, the companion board further configured to allow the gaming board and memory module to operate as if the companion board were not present; and transmit data associated with the changed information to a communications board utilizing a first protocol, wherein the communication board is configured to transmit the data to a monitoring system utilizing a second protocol.

16. The computer-readable storage medium of claim 15, further storing instructions that cause the processing resource to:

determine whether the changed information is relevant to various aspects of game play at the gaming terminal; and upon determining that the changed information is relevant, transmit the associated data to the communications board.

17. The computer-readable storage medium of claim 15, wherein the second protocol comprises the standard Slot Accounting System ("SAS") protocol.

* * * * *